(12) United States Patent
Abe et al.

(10) Patent No.: US 8,459,077 B2
(45) Date of Patent: Jun. 11, 2013

(54) MANUFACTURING METHOD FOR METAL MEMBER WITH THROUGH HOLE

(75) Inventors: Shoichi Abe, Maebashi (JP); Yasushi Watanabe, Maebashi (JP); Kazumi Shimoii, Maebashi (JP); Atsushi Tomizawa, Osaka (JP); Mitsutoshi Uchida, Osaka (JP)

(73) Assignees: NSK Ltd., Tokyo (JP); NSK Steering Systems Co., Ltd., Tokyo (JP); Sumitomo Metal Industries, Ltd., Osaka-shi (JP); Sumitomo Pipe & Tube Co., Ltd., Kashima-shi (JP)

( * ) Notice: Subject to any disclaimer, the term of this patent is extended or adjusted under 35 U.S.C. 154(b) by 1132 days.

(21) Appl. No.: 11/791,848

(22) PCT Filed: Feb. 14, 2006

(86) PCT No.: PCT/JP2006/002543
§ 371 (c)(1),
(2), (4) Date: Mar. 27, 2008

(87) PCT Pub. No.: WO2006/088023
PCT Pub. Date: Aug. 24, 2006

(65) Prior Publication Data
US 2009/0038428 A1 Feb. 12, 2009

(30) Foreign Application Priority Data

Feb. 15, 2005 (JP) .................................. 2005-037851
Feb. 17, 2005 (JP) .................................. 2005-040175
Feb. 2, 2006 (JP) .................................. 2006-025296

(51) Int. Cl.
*B21D 26/00* (2006.01)
(52) U.S. Cl.
USPC ............................................................ 72/55

(58) Field of Classification Search
USPC ................. 72/55, 71, 325–327, 330; 29/421.1
See application file for complete search history.

(56) References Cited

U.S. PATENT DOCUMENTS 2,934,981 A * 5/1960 Pearson ........................... 72/113
3,495,486 A * 2/1970 Fuchs, Jr. .......................... 83/53
(Continued)

FOREIGN PATENT DOCUMENTS

DE 103 28 452 B3 12/2004
GB 1 166 532 A 10/1969
(Continued)

OTHER PUBLICATIONS

"Experimental and numerical study of stamp hydroforming of sheet metal," by M.Zampalon, N. Abedrabbo, F. Pourboghrat, copyright(c) 2003 Elsevier Ltd., International Journal of Mechanical Sciences 45 (2003) 1815-1848, Department of Mechanical Engineering, Michigan State University, East Lansing, MI 48824-1226, USA.*

(Continued)

*Primary Examiner* — Edward Tolan
*Assistant Examiner* — Lawrence J Averick
(74) *Attorney, Agent, or Firm* — Crowell & Moring LLP

(57) ABSTRACT

To form a through hole at one portion of a side wall, of an expanded portion made by plastically deforming one part of a metal tube radially outward, in a portion where the plate thickness gradually changes, a slide tool is withdrawn from inside a punch hole while applying hydraulic pressure to the inside of the side wall. At the instant of commencing withdrawal of the slide tool, the degree of progress in the shearing for the portions of the side wall matching with the two side edges of the punch hole is made different. Then, the timing for moving from shearing to rupture is made to coincide, so that of the side wall, the portions matching with the punch hole, are made reliably into a blank, and are extracted from the side wall.

9 Claims, 23 Drawing Sheets

U.S. PATENT DOCUMENTS

| | | | |
|---|---|---|---|
| 3,496,486 A | | 2/1970 | Fuchs |
| 3,824,665 A | * | 7/1974 | Saito .............................. 29/252 |
| 5,339,667 A | * | 8/1994 | Shah et al. ........................ 72/58 |
| 5,398,533 A | * | 3/1995 | Shimanovski et al. ............ 72/55 |
| 5,460,026 A | * | 10/1995 | Schafer ............................. 72/55 |
| 5,666,840 A | * | 9/1997 | Shah et al. ........................ 72/55 |
| 5,765,420 A | * | 6/1998 | Schaefer ........................... 72/55 |
| 5,813,266 A | * | 9/1998 | Ash .................................... 72/57 |
| 5,816,089 A | * | 10/1998 | Marando ........................... 72/55 |
| 7,021,098 B2 | | 4/2006 | Griskiewitz et al. |
| 7,293,442 B1 | * | 11/2007 | Ghiran et al. ...................... 72/55 |
| 7,464,571 B2 | | 12/2008 | Uchida |
| 7,484,298 B2 | * | 2/2009 | Mellas et al. ................. 29/897.2 |
| 2002/0148270 A1 | | 10/2002 | Easterbrook |
| 2005/0016237 A1 | * | 1/2005 | Griskiewitz et al. .............. 72/55 |
| 2005/0217417 A1 | * | 10/2005 | Uchida et al. ................. 74/594.1 |
| 2006/0277958 A1 | * | 12/2006 | Uchida .............................. 72/55 |
| 2007/0157692 A1 | * | 7/2007 | Aue et al. .......................... 72/55 |
| 2007/0271979 A1 | * | 11/2007 | Kuschel et al. ................... 72/55 |
| 2008/0168817 A1 | * | 7/2008 | Ghiran et al. ..................... 72/55 |
| 2008/0190163 A1 | * | 8/2008 | Ghiran et al. ..................... 72/55 |

FOREIGN PATENT DOCUMENTS

| | | |
|---|---|---|
| JP | 55-144334 A | 11/1980 |
| JP | 6-292929 A | 10/1994 |
| JP | 8-276852 A | 10/1996 |
| JP | 2000-280032 A | 10/2000 |
| JP | 2000-351029 A | 12/2000 |
| JP | 2001-246430 A | 9/2001 |
| JP | 2001-300652 A | 10/2001 |
| JP | 2001-314926 A | 11/2001 |
| JP | 2004-98069 A | 4/2004 |
| JP | 2004-203133 A | 7/2004 |
| JP | 2004-337861 A | 12/2004 |
| WO | WO 2005/080019 A1 | 9/2005 |

OTHER PUBLICATIONS

Corresponding International Search Report dated Apr. 11, 2006 with English translation (Four (4) pages).

Supplementary European Search Report dated Mar. 16, 2010 (five (5) pages).

European Office Action dated Jul. 18, 2009 with English translation (six (6) pages).

Form PCT/IB/338, Form PCT/IB/373, and Form PCT/IS/237 (Five (5) Pages), Feb. 14, 2006.

* cited by examiner (C)

5d

↑

(B)

+

(A)

(A)　　(B)

MANUFACTURING METHOD FOR METAL MEMBER WITH THROUGH HOLE

TECHNICAL FIELD

The present invention can be used for a steering column and a manufacturing method therefor, where after forming an expanded portion by a hydroforming method, on an axial central portion of a member such as a hollow tube shape for example, this expanded portion is made into a column bracket by forming a through hole in a side wall portion of the expanded portion. Alternatively, it can used in the case where, after processing a metal plate constituting a vehicle body by a hydroforming method, an attachment hole for fixing a door knob, a turn signal light or the like, is formed in one portion of the metal plate.

In short, the metal member which is the object of the present invention, means a metal member which includes a member made of a metal plate, and in which a part which is formed with the aforementioned through hole is platy (including a flat plate, a curve plate). Of course this includes a metal plate member made by processing a flat metal plate, but also includes a metal pipe where a through hole is formed in a tube wall portion in a seam welded pipe, an extruded pipe, or the like.

BACKGROUND ART

In a steering column which constitutes a vehicle steering apparatus, at an axial central portion of a steering column which is built into a height position adjustment device for a steering wheel referred to as a tilt type steering device, or which is built into a fore and aft position adjustment device for a steering wheel referred to as a telescopic steering device, it is necessary to fix a bracket referred to as a column bracket thereto. Heretofore, typically such a column bracket which is formed separate to the steering column, is welded and secured to the steering column later on. On the other hand, in Patent Document 1 identified below, a construction is disclosed where, as shown in FIG. 15 and FIG. 16, an axial central portion of a hollow tube made of metal constituting a steering column 1 is expanded in the radial outward direction, and this expanded portion is made a column bracket 2. By adopting such a construction, the number of parts is reduced, and a light weight low cost vehicle steering apparatus can be realized.

In order to make a steering column 1 with such a column bracket 2 provided integrally, a hydroforming process is used to apply hydraulic pressure (for example water pressure) to the inner peripheral surface of a metal tube 3 (made of steel or aluminum alloy) which constitutes the steering column 1, and expand (plastically deform) one part of the metal pipe 3, as shown in FIGS. 15 and 16, in the radial outward direction. In expanding the axial central portion of the metal tube 3 by the aforementioned hydroforming process, for example as shown in FIG. 19 described later, a hollow member 11 (metal pipe) being the primary member is set inside a separable die 6 which has an inner surface shape which matches with an outer surface shape of the aforementioned metal tube 3 for which the diameter is to be expanded. Then the opposite ends of the hollow member 11 are closed by axial pushing tools 19*a* and 19*b*, and high pressure liquid of for example 196 MPa (2000 kg/cm²) is applied to the inside of the hollow member 11. By means of the applied hydraulic pressure, the axial central portion of the hollow member 11 is expanded radially outwards until it fits tightly against the inner surface of the cavity of the die 6, thereby forming an expanded portion 7 on the axial central portion of the hollow member 11. At this time, in order to prevent the expanded portion 7 becoming thin walled, the hollow member 11 is compressed in the axial direction by the two axial pressing tools 19*a* and 19*b* to enhance the supply of material to the expanded portion 7.

There is also a case where the portion expanded in the above manner is further expanded as shown in FIG. 18 (A) and (B). In the aforementioned column bracket 2 formed in a part of the steering column 1 in this manner, it is necessary to form through holes 5 for insertion of a tilt bolt 4 for example. Furthermore, these through holes 5 must be formed after forming the column bracket 2 in which a portion of the metal pipe 3 is plastically deformed. Moreover, in the case of constructing a telescopic steering device, the respective through holes 5 must be formed as long holes in the axial direction of the steering column 1.

As a technique for forming the through holes in the portion of the hollow member which is expanded by the hydroforming method, heretofore, there is known a hydropiercing method or the like as disclosed in Patent Documents 2 and 3, and Non Patent Document 1, all identified below. Three examples of the conventional technique disclosed in the Non Patent Document 1, are described in FIG. 19.

At first, in the case of a first example shown at the left side of FIG. 19, a material provided inside a die 6 is expanded by a hydroforming process to thus complete the step of forming the expanded portion 7. After this, hydraulic pressure is applied to the inside of the expanded portion 7, and in this condition, a punch 9 which is set in a cylinder hole 8 at one portion of the die 6, provided at a position matching with the portion in which a through hole 5 is to be formed, and with a tip end face made with a shape to match with the outer surface of the expanded portion 7, is pressed towards the expanded portion 7. Then, this one portion of the expanded portion 7 is punched out by the punch 9 to thereby make the through hole 5. A blank 10 produced by punching out the one portion of the expanded portion 7 by the punch 9 remains on the inside of the hollow member 11 provided with the expanded portion 7.

Next, in the case of a second example shown in the center of FIG. 19, a material provided inside the die 6 is expanded by a hydroforming process to thus complete the step of forming the expanded portion 7. After this, hydraulic pressure is applied to the inside of the expanded portion 7, and in this condition, a punch 9*a* which is set in a cylinder hole 8*a* at one portion of the die 6, provided at a position matching with a portion in which a through hole 5*a* is to be formed, and with a tip end face inclined in one direction, is pressed towards the expanded portion 7. Then, this one portion of the expanded portion 7 is broken through by the punch 9*a*, to thereby make the through hole 5*a*. The shearing or rupture to break through the side wall of the expanded portion 7 in order to form this through hole 5*a* starts from the one side of the through hole 5*a* and proceeds gradually towards the other side. Therefore, the blank 10*a* produced accompanying the working of the through hole 5*a* remains in a condition connected to the side wall of the expanded portion 7, after completion of the process for the through hole 5*a*.

Furthermore, in the case of a third example shown on the right side of FIG. 19, a material provided inside the die 6 is expanded by a hydroforming process to thus complete the step of forming the expanded portion 7. After this, hydraulic pressure is applied to the inside of the expanded portion 7, and in this condition, a slide tool 13 which is set in a punch hole 12 at one portion of the die 6, provided at a position matching with a portion in which a through hole 5 is to be formed, is moved in a direction away from the expanded portion 7. As a result, the tip face of the slide tool 13 and the outer face of the expanded portion 7 which have up to now been in contact, become separated. Since the hydraulic pressure continues to be applied to the inner face of the expanded portion 7, the portion which matches with the punch hole 12 at one portion of the side wall of the expanded portion 7 is strongly pressed to inside the punch hole 12 accompanying the loss of back up, so that it is sheared or ruptured, to thereby form the through hole 5b. In order to scavenge the blank 10b produced as a result, from inside the punch hole 12, this is removed before the next process by for example moving the slide tool 13 forward.

Of these three conventional techniques disclosed in Non Patent Document 1, according to the first example shown on the left side of FIG. 19, the blank 10 which is formed accompanying the formation of the through hole 5 remains on the inside of the hollow member 11. Therefore, after forming the through hole 5, it is necessary to eject the blank 10 from the hollow member 11. However, in the case for example where the end opening of the hollow member 111 is narrower than the size of the blank 10, or the hollow member 11 has a complicated shape, the removal of the blank 10 from inside the hollow member 11 may be impossible or difficult. Moreover, in the case of the first example, accompanying the strong pressing of the outer peripheral face of the expanded portion 7 by the punch 9 in order to form the through hole 5, the portion of the expanded portion 7 surrounding the through hole 5 is deformed (droops) in the radially inward direction of the hollow member 11. Therefore, it is difficult to maintain the shape accuracy and the dimensional accuracy of the surrounding portion after completion of the process.

Next, according to the second example shown in the center of FIG. 19, it is difficult to control the post-processing shape and dimensions of the through hole 5a to a desired accuracy. In particular, the base end portion of the blank 10a is in a connected condition, and hence one end portion (the left end portion of FIG. 19) of the through hole 5a at one portion of the side wall of the expanded portion 7 remains in a condition where the one portion of the side wall is bent and deformed, and the side wall for only the bent and deformed part becomes deformed from drooping. On the other hand, in the central portion or the other end portion (the right end portion of FIG. 19) of the through hole 5a, the side wall is deformed inwards of the expanded portion 7 by the strong pressing in the radially inwards direction by the punch 9a. As a result, in any of the portions, it is difficult to maintain the accuracy in relation to the shape and dimension of the through hole 5a. Furthermore, since the blank 10a remains in the condition where it is projecting in the radial inwards direction from the inner face of the expanded portion 7, then depending on the usage of the hollow member 11, the blank 10a may also become an obstruction.

When these matters are considered, it is preferable to form the through hole 5 in the expanded portion 7 of the hollow member 11 by the third example shown on the right side of FIG. 19. Considering such a situation, the previously considered method such as shown in FIG. 15 for making the steering column 1 provided integrally with the column bracket 2, is described using FIG. 20 to FIG. 23. In this previously considered method, at first, as shown in FIG. 20, the metal tube 3 being the primary material, and in which the plate thickness is $T_1$, is positioned at a predetermined position inside the die 6a. This die 6a, as shown in FIG. 21, is made by bringing together a pair of metal die pieces 15. On the inside, there is provided a hole portion 16 which can fit with substantially no gap, the opposite end portions of the metal tube 3, and the one half portion in the circumferential direction of the central portion, and a cavity portion 17 which protrudes radially outward from the central portion of the hole portion 16. The inner face shape of the cavity portion 17 coincides with the outer face shape of the expanded portion 7 which is to be formed. Furthermore, in one part of each of the pair of metal die pieces 15, is provided punch holes 12a at mutually matching positions, and displaced radially outwards of the hole portion 16 towards the cavity portion 17 from the central axis of the hole portion 16. Furthermore, slide tools 13a are closely fitted inside these punch hole 12a so as to be each moved back and forth with respect to the cavity portion 17.

When making the steering column 1 integrally provided with the column bracket 2, at first, as shown in FIG. 20 and FIG. 21, the metal pipe 3 is fitted inside the hole portion 16 so that the metal pipe 3 is clamped by the pair of metal die pieces 15. In this condition, the other half portion in the circumferential direction of the central portion of the metal pipe 3 faces the concavity 17. Next, while pushing the axial opposite ends of the metal pipe 3 in a direction so that these draw near to each other by means of axial pushing tools 19, hydraulic pressure (typically water pressure) is introduced to inside of the metal pipe 3. This introduction of hydraulic pressure is performed for example through central holes 18 in one or both of the axial pushing tools 19. Furthermore, when performing this operation, in the initial step of the hydraulic pressure introduction, the tip end faces 20 of both slide tools 13a and the inner face of the cavity portion 17 are made to coincide.

When in this manner hydraulic pressure is introduced to inside of the metal pipe 3, and both of the axial pushing tools 19 are moved in a direction to approach each other, the other half portion in the circumferential direction of the axial central portion of the metal pipe 3 is expanded towards the cavity portion 17. That is, a force which compresses the metal pipe 3 in the axial direction is applied while applying a strong force in the radial outward direction on the inner peripheral face of the metal pipe 3, so that the metal pipe 3 is processed into a shape following the inner face shape of the die 6a as shown in FIG. 22 and FIG. 23, that is, into a shape having the expanded portion 7a which protrudes radially outward, on the other half portion in the circumferential direction of the central portion.

If from the condition with the expanded portion 7a formed in this manner, the two slide tools 13a are withdrawn from the side wall 14 of the expanded portion 7a immediately after it has been formed, the portions matching with the two punch holes 12a at one portion of these two side walls 14 are pressed by the hydraulic pressure existing inside of the expanded portion 7a, so that the portions are pressed into inside of these two punch holes 12a, and the through holes 5c are thereby formed in the above portions.

If the technique for forming the expanded portion 7a by the hydroforming method on one portion of the metal pipe 3 in the above manner, is combined with the third example of the conventional technique shown on the right side of FIG. 19, then it is considered to be possible to form the through hole 5c in one part of the expanded portion 7a with good efficiency. However, it has been found from research by the present inventors that if the two techniques are only simply combined, the through hole 5c cannot always be stably formed. The reason for this will be explained by adding FIGS. 24 and 25 to FIGS. 22 and 23.

In the case where the expanded portion 7a is formed on one portion of the metal pipe 3 by means of hydroforming, then at the part corresponding to the expanded portion 7a, the metal plate constituting the metal pipe 3 is stretched in the surface direction. Therefore, the metal pipe 3 is compressed in the axial direction, to urge the supply of material to the expanded portion 7a, however the metal plate still becomes less than the original plate thickness $T_1$ (refer to FIG. 20). Moreover, the degree that the plate thickness becomes thinner in this manner varies within the expanded portion 7a. More specifically, since the supply rate of the material is reduced with distance from the base (the bottom portion in FIGS. 22 and 23) of the expanded portion 7a, the extent to which the plate thickness becomes thin at the portion towards the base is reduced, and the extent to which the plate thickness becomes thin towards the tip end portion (the top portion in FIGS. 22 and 23) is considerable. Furthermore, the curvature of the tip end portion also becomes great (the radius of curvature becomes small), so that at the left and right two corner portions of FIG. 23 and in the vicinity thereof, the amount that the plate thickness is reduced is remarkable.

Moreover, the plate thickness of the two side walls 14, at the portion where the two through holes 5c are to be formed becomes a non-uniform condition (gradually changing) in relation to the width direction (the vertical direction in FIG. 22 to FIG. 25) of these two through holes 5c. More specifically, the cross-section shape of the two side walls 14, at the portion where the through holes 5c are to be formed becomes a wedge shape. Moreover, the plate thicknesses $T_2$ and $T_3$ (refer to FIG. 24) of the two side walls 14 at the two edge portions in the width direction of these two through holes 5c become thick towards the base end of the expanded portion 7a, and similarly become thin towards the tip end ($T_2 > T_3$).

When forming the expanded portion 7a, the pattern for the pressure rise of the hydraulic pressure introduced to inside the metal tube 3, and the pattern (axial pressing pattern) for advancing the axial pushing tools 19 are appropriately set. That is, in the case where the increase in hydraulic pressure with respect to the increase in the axial pressing amount is fast, reduced thickness of the expanded portion becomes pronounced, so that there is a high possibility of cracking occurring. On the other hand, in the case where the increase in the pressing amount is given precedence over the increase in hydraulic pressure, then buckling of the material is likely to occur. In general, axial pressing is given precedence within a range where buckling does not occur, and if the final axial pressing amount is set large, the difference between the thicknesses $T_2$ and $T_3$ at the two end portions, and the difference from the original thickness $T_1$ can be made small. For the inside-out hydropiercing as shown on the right side of FIG. 19, in the case where the normal working method as disclosed in Non Patent Document 1 is adopted, then of the respective plate thicknesses $T_1$, $T_2$ and $T_3$, the difference for the plate thicknesses $T_2$ and $T_3$ of the two end portions, when viewed from the side where the plate thickness is thick, preferably is within 5%, and more preferably is within 3%, from the aspect of forming the two through holes 5c. However, in the case where asymmetry of the product shape is remarkable, then even if the axial pressing pattern or the hydraulic pressure increase pattern is adjusted, the non-uniformity of the plate thickness cannot be sufficiently cancelled. In particular, in the case where as shown in FIG. 20 to FIG. 23, the expanded portion 7a is formed on only one side of the metal pipe 3, then as mentioned above, the plate thickness of the side wall 14 where the through hole 5c is to be formed becomes non-uniform. In other words, the situation also arises where the difference of the plate thicknesses $T_2$ and $T_3$ of the two end portions, when viewed from the side where the plate thickness is thick, exceeds 3%, or even exceeds 5%.

In this manner, even though the thickness of the side wall 14 where the through hole 5c is to be formed may become non-uniform, as shown in FIG. 21, and FIG. 23 to FIG. 25, in the case where the slide tool 13a with the tip end face 20 being a smooth face parallel with the two side walls 14 is used, it is difficult to stably form the through hole 5c. That is, in the case where the slide tool 13a with the tip end face 20 thereof in the aforementioned simple shape is used, then if the shape of the through hole is complicated such as an oval shape or an ellipse shape etc., or even with a simple circular hole, in the case of forming a through hole where the aperture area is large, the blank cannot be completely removed from the portion which becomes the through hole, so that this blank is likely to remain in a condition partially connected to the material. In particular, as with the case where the through hole 5c is formed in the side wall 14, in the case where a through hole is formed in a portion where the plate thickness is uneven, the problems as mentioned above are likely to occur.

That is, even though there may be a difference of more than 5%, in the plate thicknesses $T_2$ and $T_3$ of the opposite end portions, in the case where the through hole 5c is formed as mentioned above using the slide tool 13a with the flat end face 20, then at approximately the same time as when the slide tool 13 starts to move back, the portion facing the punch hole 12a at one part of the side wall 14 starts to be deformed (strained) towards the inside of the punch hole 12a. Then, at the point in time when the slide tool 13a has moved back a certain amount, the portion facing the punch hole 12a at the one part of the side wall 14 where the plate thickness $T_3$ is thin, becomes fractured prior to the portion facing the punch hole 12a at the one part of the side wall where the plate thickness $T_2$ is thick. As a result, as shown in FIG. 25, the portion facing the punch hole 12a at the one part of the side wall 14, where the plate thickness $T_2$ is thick, remains connected to the side wall 14, under a condition where the same hydraulic pressure exists on both sides of the portion which is to be punched out. That is, the hydraulic pressure on the inside of the metal pipe 3 is released from the rupture location. As a result, even if the slide tool 13a is moved back more than this, the fracture of the portion connected to the side wall 14 where the plate thickness $T_2$ is thick does not progress, so that the through hole 5c can no longer be formed. In this manner, a phenomena where one part of the portion to be punched out remains in a condition connected to the side wall 14, becomes more remarkable the greater the difference between the metal thickness of the portions where the through hole is to be formed, or the more difficult the shape such as the oval shape, than for when the shape of the through hole is a round hole.

As shown in FIG. 19, in the case of the heretofore known hydropiercing, the expanded portion 7 becomes a symmetrical shape (or approximately symmetrical shape) in relation to the central axis of the hollow member 11, and the metal thickness of the tube wall of the portion where the through hole is to be formed is substantially uniform. Therefore, even in the case of so called inside-out hydropiercing where the portion to be punched out is punched out to the radial outside, the through hole can be formed. However, in the case of the column bracket 2 of the steering column 1, making the plate thickness of the tube wall of the portion where the through hole is to be formed uniform is difficult, as mentioned before. Furthermore, in the case of the hole forming method described for the left and the center of FIG. 19, even if the plate thickness of the portion where the through hole is to be formed is uneven, the shape itself of the through hole is possible, however there are the aforementioned problems.

In the method described in Patent Documents 2 and 3, the overall process is complicated, so that an increase in cost cannot be avoided. Consequently, the situation as shown in FIG. 20 to FIG. 23 where the working for the expanded portion 7a and the operation for forming the through hole 5c are made successive to improve the efficiency, is not an alternative method for reducing cost.

Patent Document 1: Japanese Patent Application Publication No. H8-276852

Patent Document 2: Japanese Patent Application Publication No. H6-292929

Patent Document 3: Japanese Patent Application Publication No. 2001-314926

Non patent document 1: Frank-Ulrich Leitloff and Steffen Geisweid, "Application of Tube Hydroforming Technology to the Production of Automotive Components", Journal of the Japan Society for Technology of Plasticity Vol. 39 no. 453 (1998-10)

DISCLOSURE OF THE INVENTION

Problems to be Solved by the Invention

The present invention takes into consideration the above situation and has been invented in order to realize a structure and method whereby an operation for forming a through hole at one portion of a member made of metal and of which at least one part is sheet form, in a non-uniform wall thickness part where there is a difference in the plate thickness of the part made in this sheet form, can be performed stably and at low cost.

Means for Solving the Problem

In a metal member with a through hole according to the present invention, at one portion of the member made of metal and of which at least one part is sheet form, a through hole is provided in a non-uniform wall thickness part where there is a difference in the thickness of the part made in this sheet form, in a condition passing through this part.

This through hole is formed by hydropiercing, where in a condition with one face of the non-uniform wall thickness part contacted against a die, while applying a hydraulic pressure to the other face of the non-uniform wall thickness part, a portion corresponding to a punch hole provided in the die, at the non-uniform wall thickness part is pressed into this punch hole.

In this hydropiercing, for example the shearing phenomena is performed so as to be completed simultaneously around the entire periphery of the through hole to be formed.

So that the shearing phenomena is completed simultaneously in this manner, then for example the timing of shearing commencement by the hydropiercing at the periphery of the through hole to be formed is adjusted corresponding to a wall thickness distribution.

Alternatively, the timing for cracking causing rupture, at the periphery of the through hole to be formed is adjusted corresponding to the wall thickness distribution.

Therefore, as a slide tool to be inserted into the punch hole of the die, a slide tool is used which has a tip face which projects to an inside of the die on a side where the plate thickness is small, and which has a hollowed shape towards an outside of the die on a side where the plate thickness is thick, corresponding to the wall thickness distribution of the material which is to be subjected to the shearing process. Furthermore, in a condition with the inner face of the die abutted against one face of the non-uniform wall thickness part, while applying a hydraulic pressure to the other face of the non-uniform wall thickness part, the slide tool is displaced in a direction to withdraw from this non-uniform wall thickness part, so that the portion corresponding to the punch hole at the non-uniform wall thickness part is pressed into this punch hole by the hydraulic pressure.

Alternatively, a die is used where a radius of curvature of a cross-section shape of a cutting edge portion being a peripheral portion of a punch hole of the die which is made to correspond to a wall thickness distribution of a material which is to be subjected to the shearing process with the cutting edge portion, is formed small on a side where the wall thickness is thick, and large on a side where the wall thickness is thin.

In any of these cases, a shearing stress occurs in the portion of the non-uniform wall thickness part which corresponds to the whole periphery of the punch hole, so that the shearing phenomena occurs in this portion. Furthermore the shearing phenomena is simultaneously associated with a rupture, so that the through hole is formed in the portion matching with the punch hole.

This point will be explained with reference to FIG. 1. FIG. 1 (A) to (C) are sectional drawings showing, in steps, the conditions for forming a through hole in one part of a plate shape portion (hereunder metal plate 25) at one part of a metal member, by a shearing process using hydropiercing. The aforementioned so called inside-out hydropiercing is basically a shearing process by means of a cutting edge portion being the peripheral portion of the punch hole 12 provided in the die 6. An examination of this shearing process in more detail, is as follows. At first, as shown in FIG. 1 (A), in a first step where the slide tool 13 is moved outwards from the punch hole 12 of the die 6, a part of the metal plate 25 is inserted into a recess produced by the withdrawal of the slide tool 13, and this part is plastically deformed in a convex shape.

If the movement (withdrawal) of the slide tool 13 is continued even after the occurrence of plastic deformation, then as shown in FIG. 1 (B), due to the cutting edge portion 26 provided on the peripheral portion of the punch hole 12, a shear face 27 starts to be formed on the one face (outside face, right face in FIG. 1) side of the portion of the metal plate 25. Then, at a stage where the process of the shear face 27 has progressed to some extent, as shown in FIG. 1 (C), a crack 28 produced from the shear face 27 penetrates through as far as the other face (left face of FIG. 1) side of the metal plate 25, and the metal plate 25, which remained to be unsevered, is instantly broken, thereby completing the shearing. The blank 10 produced as a result is discharged to the one face side of the metal plate 25. On the outside face of the metal plate 25, that is, the front face of the product, as shown in FIG. 1 (C), there is no occurrence of a defect portion due to shear droop or the like.

The shearing by means of inside-out hydropiercing is one where as mentioned before, the plastic deformation, the shearing, and the rupture are all combined. However in the case of the present invention, of these, the timing of shearing commencement is adjusted to correspond to the wall thickness distribution, so that the hole can be formed by the inside-out hydropiercing, irrespective of this wall thickness distribution. In the claims and specifications of this case, the starting point for forming the shear face 27 as shown in FIG. 1 (B) is the "timing of shearing commencement", and the point in time where the crack 28 shown in the same FIG. 1 (C) passes through in the direction of the thickness of the metal plate 25 to start the rupture, so that the material is completely separated is "the timing for cracking causing rupture" (the timing for completion of the shearing phenomena).

As contrasted with to the above described present invention, in order to form the through hole in the non-uniform thickness portion of the metal plate 25, if in this portion, inside-out hydropiercing as shown on the right side of FIG. 19 is performed without any special device, the shearing phenomena is finished first at the portion where the wall thickness of the surroundings where the through hole is to be formed is the thinnest, and only at this portion the crack 28 penetrates in the thickness direction of the metal plate 25. Due to the partial finishing of the stress phenomena, then as described for the aforementioned FIG. 25, pressure relief occurs so that the subsequent shearing does not progress, and a cutting remnant occurs as shown in FIG. 25. Therefore, heretofore as mentioned before, in order to form the through hole in the non-uniform thickness portion, inside-out hydropiercing cannot be applied. On the other hand, in the case of the present invention, even if there is the non-uniform thickness portion, since the timing of shearing commencement is changed corresponding to the wall thickness distribution, the situation where the shearing phenomena of the portion where the wall thickness is thin advances until this is partially ruptured and the shearing phenomena of the portion where the wall thickness is thin clearly finishes before that for the portion where the wall thickness is thick can be avoided. More specifically, compared to the portion where the wall thickness is thin, at the portion where the wall thickness is thick, for example the timing of shearing commencement is made sooner. Hence, the timing is arranged for cracking causing rupture on completion of shearing at the portion where the wall thickness is thin and where it is thick (the final rupture is made to occur simultaneously around the whole perimeter of the through hole). That is, the timing is arranged for completion of the shearing phenomena around the whole perimeter of the through hole to be formed, so that complete inside-out hydropiercing is possible without any cut remnants.

A favorable situation for implementing the above mentioned present invention, is the point that the timing of shearing commencement corresponding to the wall thickness distribution does not need to be managed precisely. That is, when forming the through hole, the last of the shearing phenomena occurring at the portion corresponding to the perimeter of the through hole, is at the rupture due to the penetration of the crack. If the shearing phenomena proceeds for a certain amount to the perimeter portion of the through hole, this rupture propagates along this perimeter portion. Consequently, if the timing of the progress of the shearing phenomena is adjusted so that the remaining amount of shearing is arranged around the whole perimeter of the through hole to be formed to a certain degree of accuracy (at the instant where a crack occurs in one part, shearing proceeds a certain amount more in the residual portion), then the timing for completion of the shearing phenomena (crack occurrence) is arranged around the whole perimeter of the through hole to be formed in practice. That is, it is sufficient if adjustment of the timing of shearing commencement is made to the extent that the rupture occurs simultaneously around the whole perimeter at the peripheral portion of the through hole. Furthermore, this adjustment of the timing can be carried out relatively easily by for example changing the shape of the tip end face of the slide tool. Therefore adjustment of the timing of shearing commencement is an extremely realistic measure from the point of arranging the timing for crack occurrence.

Furthermore, even supposing that the timing of shearing commencement is simultaneous around the whole perimeter, if the timing for cracking causing rupture at the perimeter of the through hole to be formed is adjusted corresponding to the wall thickness distribution, so that rupture due to cracking is made to occur at the portion where the wall thickness is thick earlier than at the portion where this is thin, then the rupture can be made to finish simultaneously around the whole perimeter. That is, also by adjusting the timing for cracking causing rupture, corresponding to the wall thickness distribution of the metal place, the timing for completion of the shearing phenomena can be arranged at the whole perimeter of the peripheral portion of the hole to be formed, so that the inside-out hydropiercing becomes possible. A counter measure for this is for example a design for the die side. More specifically, this is possible by changing the radius of curvature of the cross-section of the cutting edge portion being the peripheral portion of the die punch hole. That is, a die is used where the radius of curvature of the cross-section shape of the cutting edge portion is formed small at the side where the wall thickness is thick, and is formed large at the side where the wall thickness is thin, corresponding to the wall thickness distribution of the material which is subjected to the shearing process, so that the occurrence of rupture due to the crack is delayed at the side where the wall thickness is thin. If this is done, the timing for completion of the shearing phenomena (crack occurrence) can be arranged even if adjustment of the timing of shearing commencement is not made. By combining the design for the shape of the tip end portion of the slide tool, and the design for the radius of curvature of the cutting edge portion mentioned above, it is also possible to arrange the timing for completion of the shearing phenomena.

The former technique for making the rupture occur simultaneously around the whole perimeter by designing the tip end shape of the slide tool, combines both of the adjustment of the timing of shearing commencement, and adjustment of the timing for crack occurrence, to arrange the timing for completion of the shearing phenomena. On the other hand, the latter technique for making the rupture occur simultaneously around the whole perimeter by designing the radius of curvature of the cutting edge portion, mainly arranges the timing for the completion of the shearing by adjusting the timing for cracking causing rupture. Consequently, the design of the tool is carried out corresponding to the wall thickness distribution of the material, so as to obtain a timing difference necessary for the shearing phenomena around the whole length of the peripheral portion of the through hole to be formed, to be completed simultaneously. For example, in order to delay the timing of shearing commencement at the portion where the wall thickness is thin, then at the initial stage of the process for the portion, a compressive stress is applied in the perpendicular direction with respect to the shearing face, and the radius of curvature of the peripheral portion (cutting edge portion) of the punch hole is made large. On the other hand, in order to hasten the timing of shearing commencement at the portion where the wall thickness is thick, the shearing start itself is made earlier, or a drawing stress is applied at the initial stage of the process for this portion.

The metal member with the through hole which is the object of the present invention, is one for which combination with a hydroform process (hydroforming) is appropriate. Therefore in general, this is a tubular element having a closed cross-section, but this may be a sheet member, and the shape is not particularly limited. In the case of a tubular element, this may be either of a seam welded pipe, or a seamless pipe (including an extruded pipe). Furthermore, the portion where the through hole is to be formed in the plate member is not limited to a flat portion, and may be a curved portion. For example, hydroforming and hydropiercing can be also applied to a flat plate or a curved plate of a vehicle body or the like. In such a case, after forming the flat plate or the curved plate, the through hole can be formed following on from that state. Therefore the manufacturing process can be simplified. A representative metal member with a through hole is for example an outer tube for a steering column having an integral type column bracket. This integral type column bracket is formed for example by hydroforming. Furthermore, the non-uniform thickness portion of the metal member with the through hole is referred to as a portion where the wall thickness is different, and includes not only the case where the wall thickness is continuously changed, but also when changed stepwise, and when changed continuously and stepwise (the continuously changed portion and the stepwise changed portion are mixed).

The rate of change (the difference between the minimum wall thickness and the maximum wall thickness) of the wall thickness of the metal member at the portion (non-uniform thickness portion) where the through hole is to be formed, is not particularly important. The present invention is effective irrespective of the largeness or smallness of the rate of change. However, considering that the larger the rate of change of the wall thickness, the more difficult the through hole forming by means of a general inside-out hydropiercing, then the larger the rate of change of the wall thickness, the greater the effectiveness of the present invention. That is, in the case where this is greater than 3%, it is effective to execute the present invention, and is even more effective in the case where this is 5% or more.

The non-uniform thickness portion is formed by various factors. This occurs not only in the shape of the expanded portion due to the hydroforming mentioned above, but also occurs with other plastic working such as drawing or bending. Furthermore, there are also cases where this occurs other than with plastic working, and hence in the case of defining the technical scope of the present invention, the factors which produce this non-uniform thickness portion are not limited. Similarly, the shape also of the non-uniform thickness portion, as mentioned above, is not particularly limited. For example, in the case where the tube is bent, the bent outer peripheral side becomes thinner, and the bent inner peripheral side becomes thicker so that a wall thickness difference occurs. Also in the case where hydroforming is applied to an element which has been subjected to this bending, to form a flat portion, consequentially a wall thickness difference occurs. Even in the case where a through hole is formed in a flat surface or a curved surface in which a difference occurs in the plate thickness due to such causes, the present invention is affective. Furthermore, the type of the metal does not particularly matter. Needless to say this can be an iron alloy such as steel, or a nonferrous alloy such as aluminum alloy, copper alloy, and the like but other types of metal and alloy are possible.

EFFECT OF THE INVENTION

According to the metal member with a through hole of the present invention constructed as described above, and the manufacturing method therefor, an operation for forming a through hole at one portion of a member made of metal and of which at least one part is sheet form, in a non-uniform thickness part where there is a difference in the thickness of the part made in this sheet form, can be performed stably and at low cost.

That is, by devising the shape of the tip end face of a slide tool, or the shape of the peripheral portion of a punch hole of a die, then even in the case where the plate thickness of a portion of the member which is made in sheet form is non-uniform, the difference in this plate thickness between the opposite sides of the punch hole can be cancelled or reduced. Therefore, accompanying the withdrawal of the slide tool from the non-uniform thickness portion, the portion of this non-uniform thickness portion opposite to the punch hole is torn and broken around the whole perimeter of the punch hole, and hence the through hole can be reliably formed.

BEST MODE FOR CARRYING OUT THE INVENTION

Figure 1:
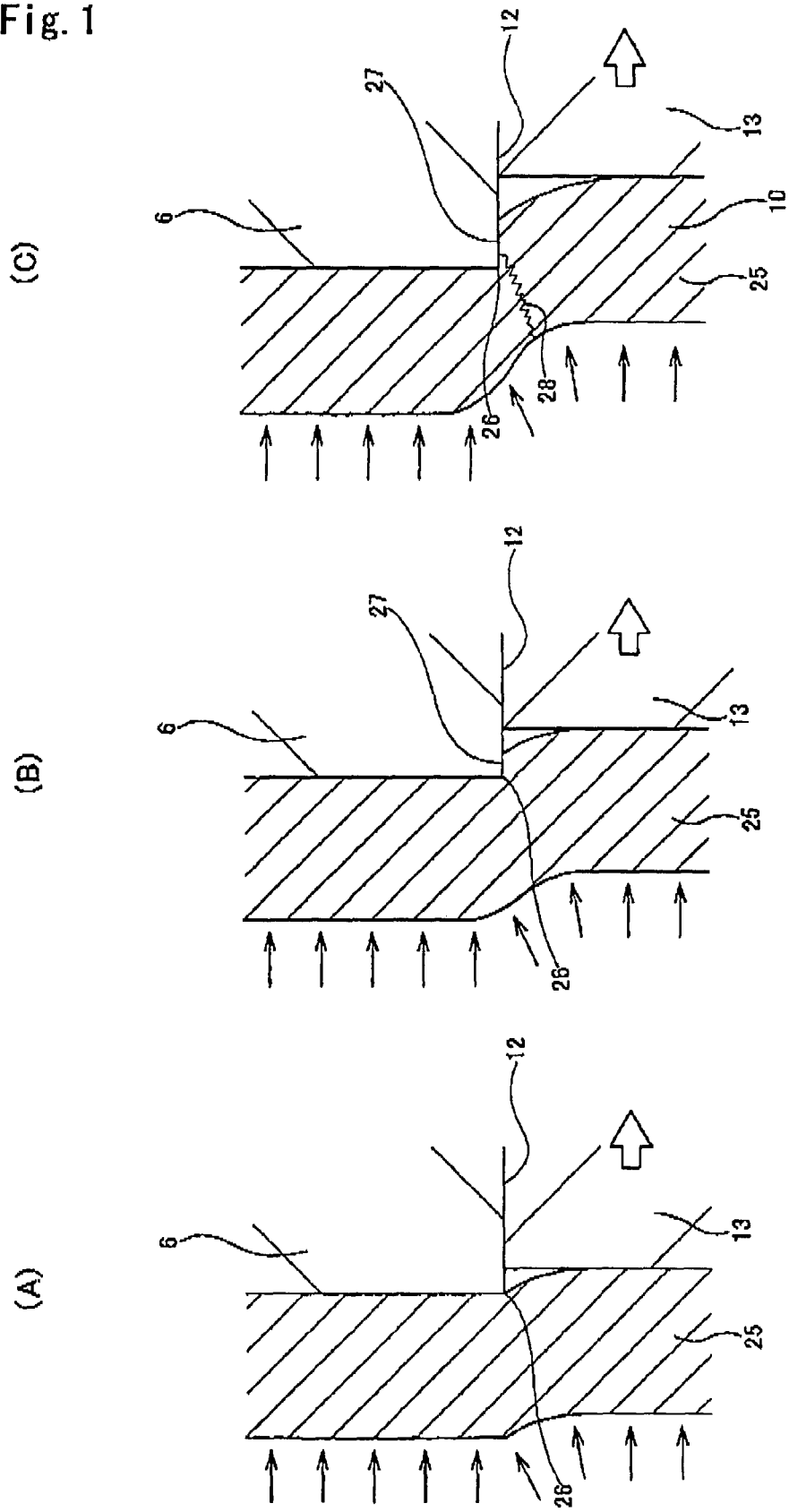
FIG. 1 is a partial cross-section showing a progress condition of hydropiercing, for explaining a principal of the present invention.

In the case where the present invention is executed using a slide tool having a shape where the tip end face is protruded towards the inside of the die on the side where the wall thickness is small, and is depressed towards the outside of the die on the side where the wall thickness is thick, corresponding to the wall thickness distribution of the material which is to be subjected to shearing, then for example the portion of the tip end face of the slide tool which protrudes most, is positioned at a position coinciding with the inner face of the die. Then, the tip end face is abutted against the one face of the non-uniform thickness portion, on the side of the non-uniform thickness portion where the plate thickness is thin, and faces the side where the plate thickness is thick across a gap. By displacing the slide tool from this condition on the inside of the punch hole in a direction so as to withdraw it from the non-uniform thickness portion, the through hole is formed.

In the case when constructed in this manner, in a condition before withdrawing the slide tool (a condition where the portion of the tip end face of the slide tool which protrudes the most is positioned at a part coinciding with the inside face of the die), the portion of the non-uniform thickness portion at the part facing the gap, that is, the portion on the side where the plate thickness is thick, is pressed in a little to inside the gap. As a result, at the part of the portions on the side where the plate thickness is thick, which is abutted with one end edge of the opening portion of the punch hole, shearing starts before at the other parts. At the same time, the plate thickness of this part is reduced a little, so that a difference between the plate thickness of this part and the plate thickness of the part of the portions on the side where the plate thickness is thin, which faces the other end edge of the opening of the punch hole, is reduced or is cancelled. Therefore, if the slide tool is withdrawn from this condition, shearing also starts at other portions. Then, the portion of the non-uniform thickness portion, which faces the punch hole ruptures around the whole perimeter of the opening portion of the punch hole, and is pushed in to inside the punch hole so that the through hole is formed.

Alternatively, the portion of the tip end face of the slide tool which protrudes the most, is protruded from the inside face of the die, and the portion which does not protrude the most is positioned coinciding with the inside face or recessed from the inside face. In a condition with the tip end face of the slide tool positioned at such a position, hydraulic pressure is made to act on the face on the opposite side to the face which faces the slide tool, at the one side of the non-uniform thickness portion, so that this non-uniform thickness portion follows the tip end portion of the slide tool and is bent. In this condition, the tip end face of the slide tool is in a condition where it abuts against the one face of the non-uniform thickness portion which is bent in this manner. Therefore from this condition, by displacing the slide tool on the inside of the punch hole, in a direction to withdraw from the non-uniform thickness portion, the through hole is formed.

When constructed in the above manner, by making a hydraulic pressure act on the one side of the non-uniform thickness portion, then the part of the portions corresponding to the opposite edge of the portion where the through hole is to be formed, at the one part of the non-uniform thickness portion, on the side where the plate thickness becomes thin is deformed by a relatively large amount in an opposite direction to the direction of deformation when the slide tool is withdrawn and the through hole is formed. On the other hand, the part on the side where the plate thickness is relatively thick is not deformed in the opposite direction to the direction of deformation when the through hole is formed, and even if this is deformed, the deformation amount is kept insignificant.

If from the condition where the shape of the two portions becomes as described above corresponding to the plate thickness of the portion corresponding to the two edges of the portion where the through hole is to be formed at one part of the non-uniform thickness portion, the slide tool is withdrawn inside the punch hole from the non-uniform thickness portion, then a portion of this non-uniform thickness portion which matches with the punch hole is pressed into the punch hole. At this time, the portion where the plate thickness is relatively thick starts to immediately be pressed into the punch hole so that shearing starts. On the other hand the portion where the plate thickness is thin is deformed until it once become parallel with the other portion, and is then pressed into the punch hole. Moreover, in the process of deforming the portion where the plate thickness is thin until it once becomes parallel with the other portion, and then pressing into the punch hole, a compressive stress is applied to this portion to give a condition where this portion is not likely to rupture (the timing of rupture is delayed). Furthermore, the plate thickness of this portion is slightly increased.

Therefore, there is no longer a large difference between the timing from shearing commencement until rupture at the portion where the plate thickness is relatively thick, and the timing from shearing commencement until rupture at the portion where the plate thickness is small. As a result, the portion of the non-uniform thickness portion which faces the punch hole is pressed into the punch hole while rupturing simultaneously around the whole periphery of the rim of the punch hole, so that the through hole is formed.

In the case of executing the present invention, a portion where the plate thickness gradually changes for example at a part of the non-uniform thickness portion, becomes the side wall of the expanded portion made by expanding out one part of the material by hydroforming.

In this case, for example the metal member is a steering column with one part of a hollow tube expanded out in the radial direction by hydroforming, and a through hole formed in a side wall of the expanded portion made by this expansion. Moreover, following the operation for processing this expanded portion, the forming operation for this through hole is carried out.

If the present invention is executed for this embodiment, the expanded portion, and the through hole can be successively formed without transferring the material. Hence the manufacturing costs can be reduced due to simplification of the process.

Furthermore, in this case, for example when a virtual plane is considered which includes a central axis of the hollow tube and extends in a perpendicular direction to a direction in which the expanded portion expands, the whole of the through hole is formed at a position away from the virtual plane in the expansion direction.

The plate thickness of the portion of the side wall portion constituting the expanded portion, which exists at this position gradually changes. Therefore, forming the through hole according to the present invention in such a side wall portion is effective.

EXAMPLE 1

FIG. 2 to FIG. 5 show a first example of the present invention. The feature of this example is the point that after plastic deforming one part of a metal tube 3 in the radial outward direction by hydroforming such as illustrated before in FIG.

Figure 15:
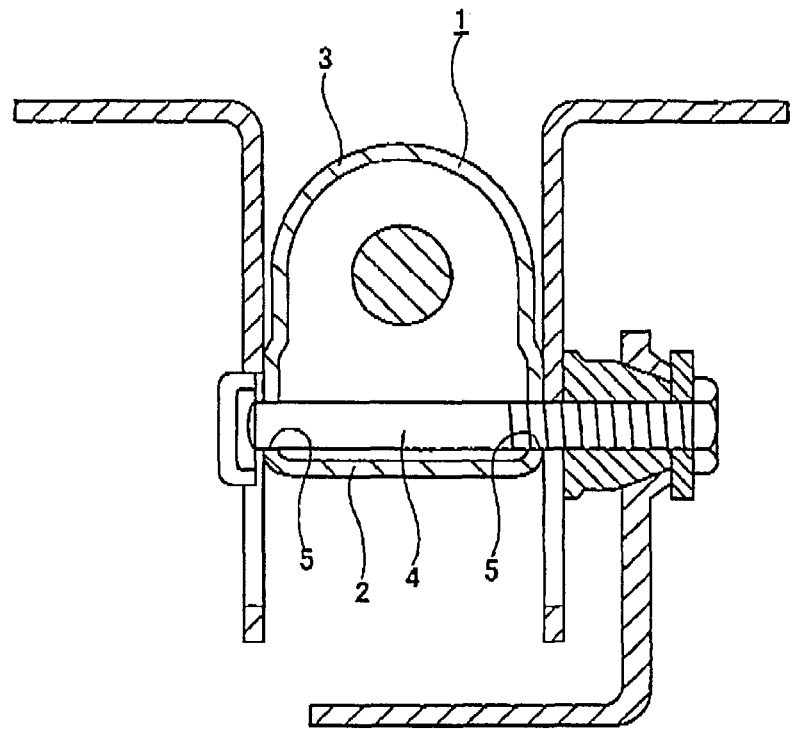
FIG. 15 is a cross-section showing a conventional example of a steering column in which the column bracket is integrally provided.
Figure 16:
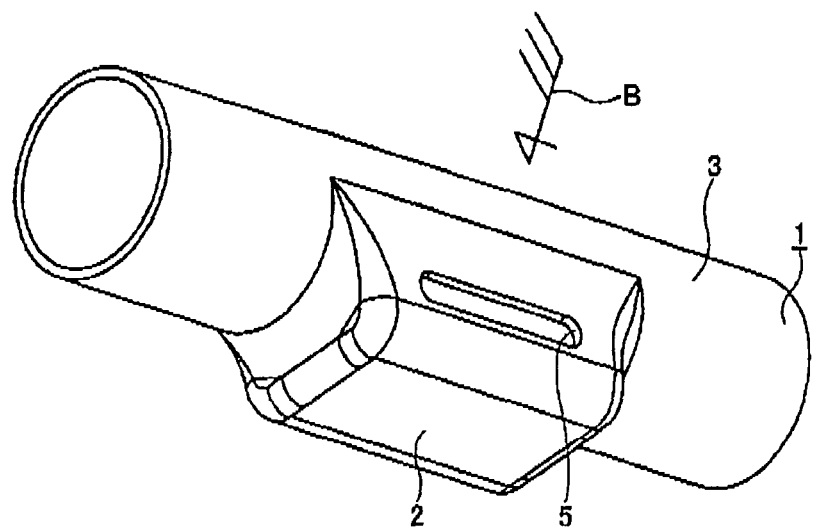
FIG. 16 is a partial perspective view of FIG. 15.
Figure 23:
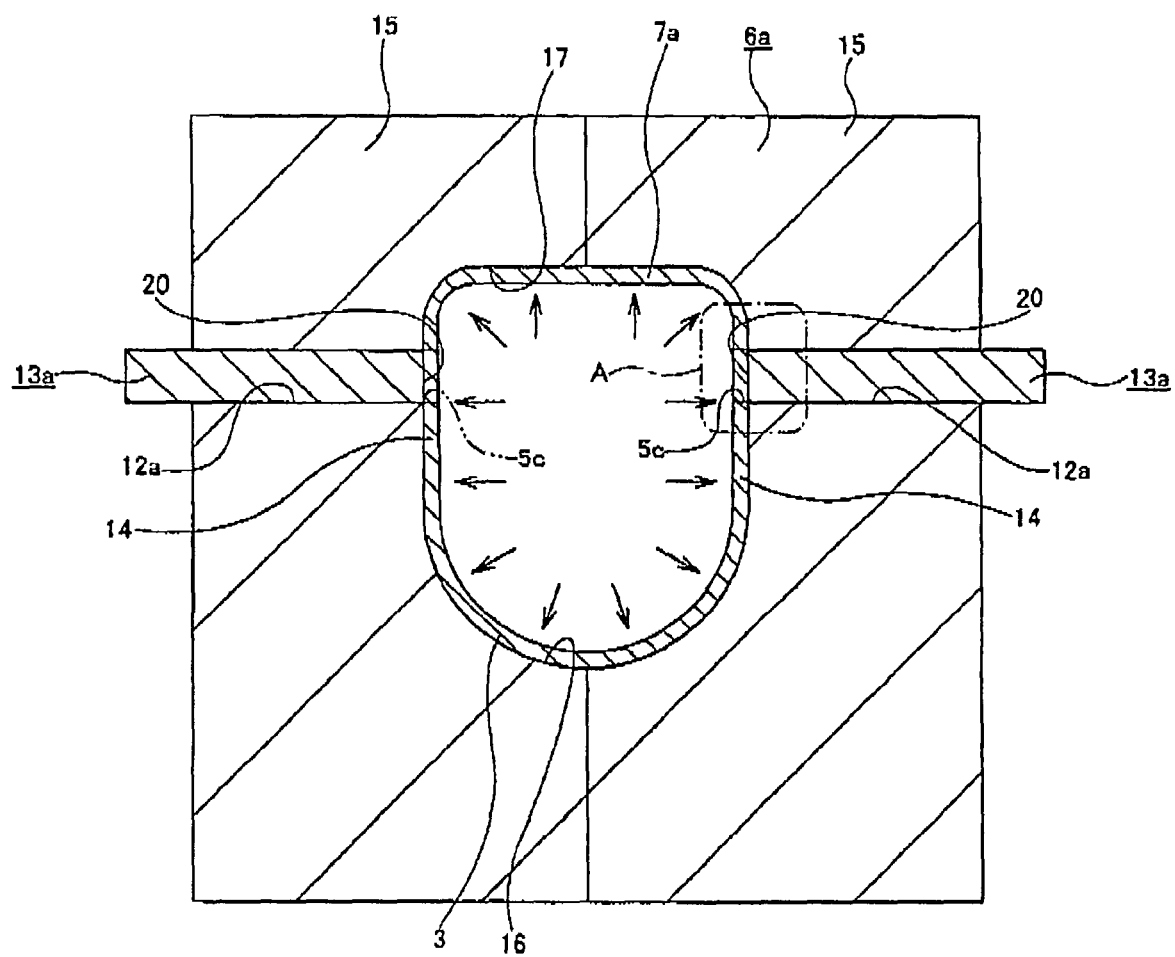
FIG. 23 is a cross-section on E-E of FIG. 22.

20 to FIG. 23, and forming the expanded portion 7a as shown before in FIG. 15 and FIG. 16, then by devising a process for forming a through hole 5c in the side wall 14 of the expanded portion 7a, this through hole 5c can be reliably formed. Concerning the point of forming the expanded portion 7a, this has been explained before. Therefore, hereunder the description centers on the characteristic parts of this example with omission or simplification of repeated description.

Also in the case of this example, a punch hole 12a is provided in a part of a metal die piece 15 constituting a die 6a, facing a portion of the side wall 14 where the above mentioned through hole 5c is to be formed, and has a shape (for example ellipse shape) which matches (substantially coincides) with this through hole 5c. Moreover, a slide tool 13b for forming the through hole 5c is fitted tightly inside the punch hole 12a and so as to be moveable back and forth with respect to the side wall 14. A tip end face 20a of the slide tool 13b used in this example, has one edge portion (top edge portion in FIG. 2 to FIG. 5) in a widthwise direction (vertical direction in FIG. 2 to FIG. 5) of the punch hole 12a (or the through hole 5c), as a flat face 21 parallel with the inside face of the metal die piece 15, and the central portion or the other edge portion (the lower edge portion in FIG. 2 to FIG. 5) is made an inclined face 22 which is inclined in a direction away from the side wall 14 with separation from the flat face 21. At the time of the hydroforming process for forming the expanded portion 7a on one part of the metal pipe 3, the slide tool 13b is advanced inside the punch hole 12a so that the flat face 21 is positioned on the same plane as the inner face of the metal die piece 15. Consequently, the portion of the tip end face 20a of the slide tool 13b which corresponds to the inclined face 22, is in a condition set back further than the inside face of the metal die piece 15.

Figure 2:
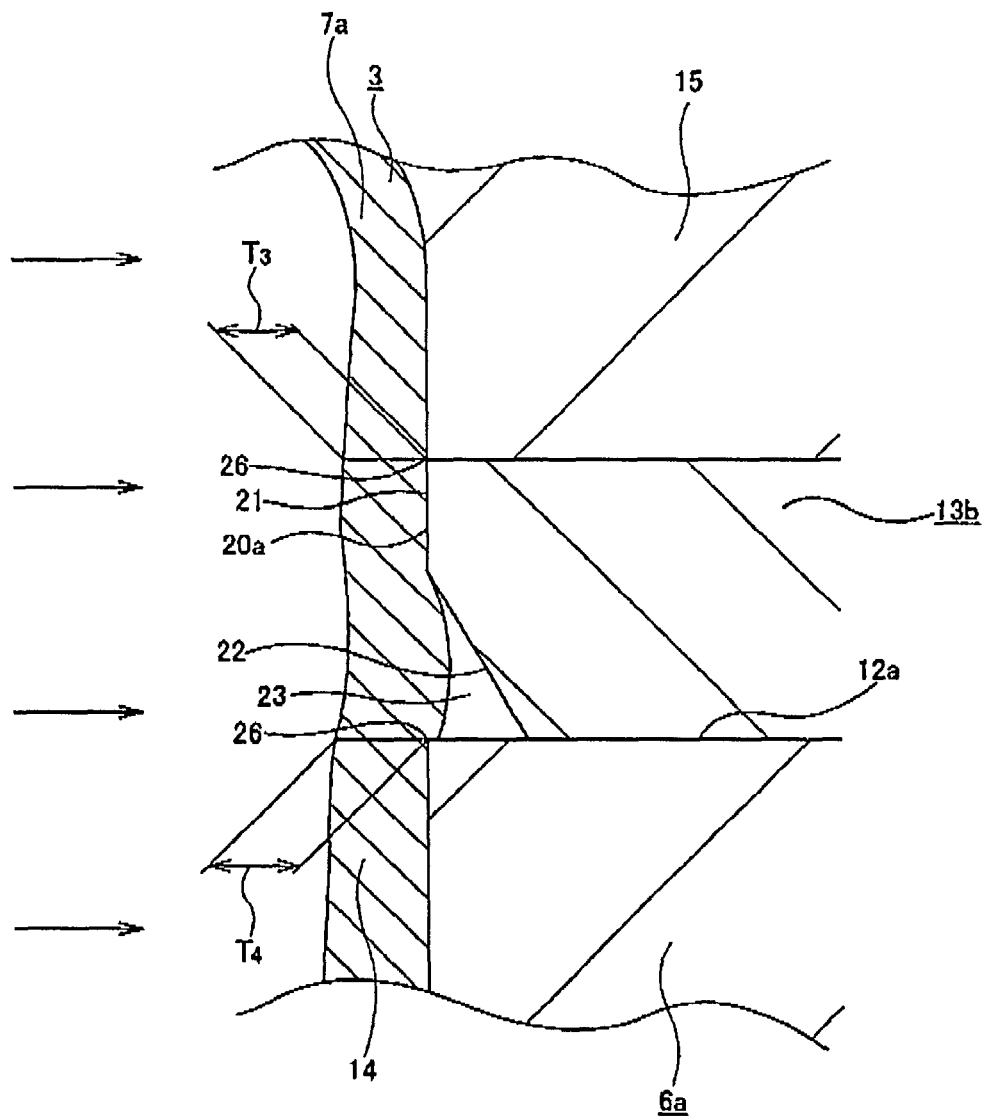
FIG. 2 is an enlarged cross-section corresponding to a portion A of FIG. 23, showing a condition before forming a through hole, in a first example of the present invention.

With the slide tool 13b in the aforementioned advanced condition, hydraulic pressure is introduced to inside the metal pipe 3, and also a force is applied in the direction to compress the metal pipe 3 in the axial direction to thereby form the expanded portion 7a. In this case, the fact that the plate thickness of the side wall 14 of the expanded portion 7a is less towards the top of FIG. 2 to FIG. 5, is as mentioned before. In the present example, accompanying the processing of the expanded portion 7a, the portion corresponding to the inclined face 22 at the one part of the side wall 14 of the expanded portion 7a slightly enters inside a gap 23 existing between and the side wall 14 and the inclined face 22 as shown in FIG. 2. Then, a drawing stress in a direction perpendicular to the shear face is applied to the portion which has entered to inside the gap 23 in this manner, and a shearing stress is applied to the portion abutting with the cutting edge portion 26 existing on the rim of the punch hole 12a, at one part of the side wall 14.

Figure 24:
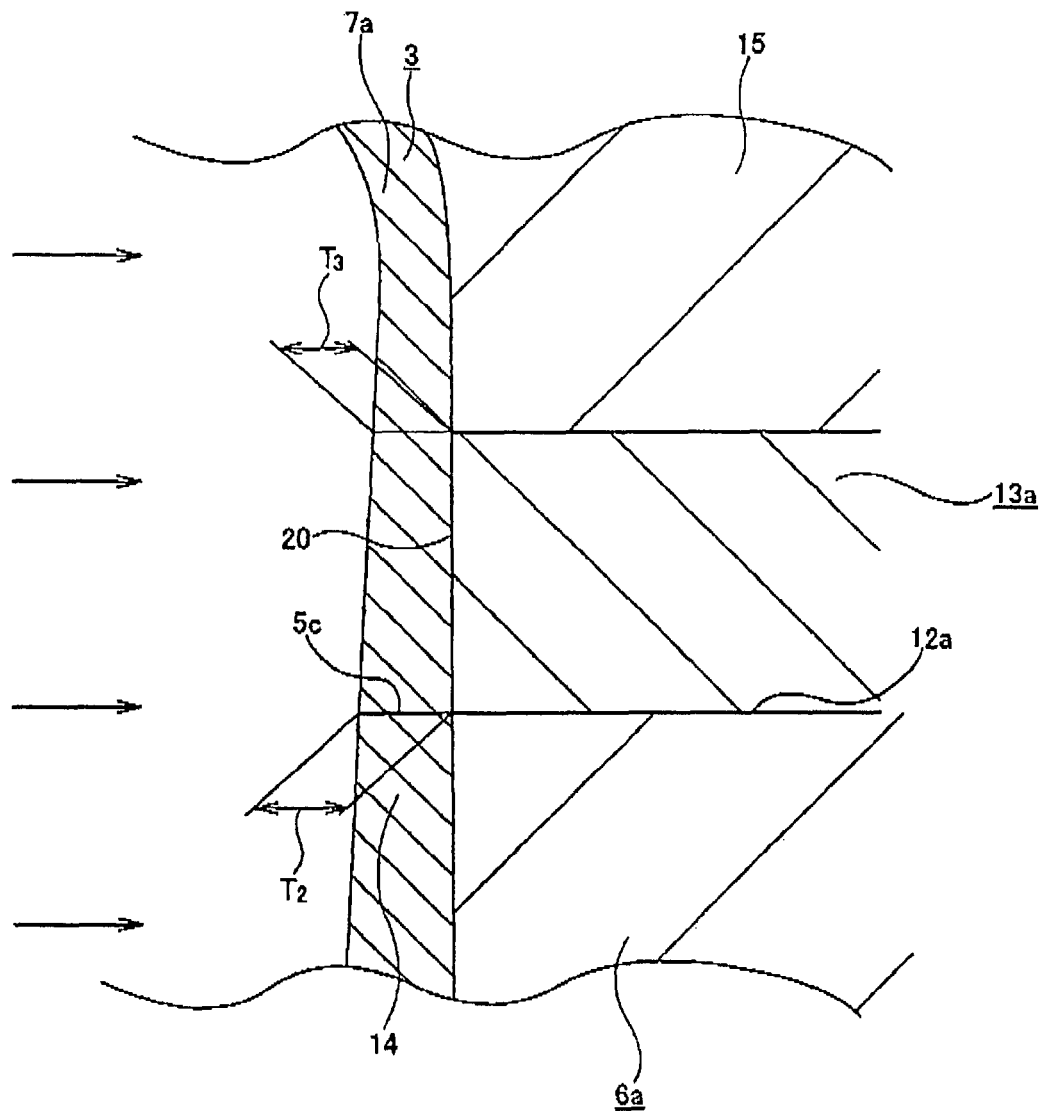
FIG. 24 is an enlarged cross-section of the part A of FIG. 23.

That is, in addition to the stress in the drawing direction perpendicular to the shear face, a bending stress is slightly added on the side (the upper side in FIG. 2) of the two edge portions of the portion corresponding to the gap 23, which faces the connecting portion between the flat face 21 and the inclined face 22, so that one part of the side wall 14 is bent back. On the other hand, a shearing stress due to the cutting edge portion 26 and hydraulic pressure, is applied to the side (the lower side in FIG. 2) which faces the cutting edge portion 26 existing on the rim of the opening of the punch hole 12a, and the shearing starts at this portion. At the same time, the plate thickness $T_4$ of the aforementioned portion becomes less compared to the plate thickness $T_2$ (refer to FIG. 24) in the condition where the gap 23 does not exist ($T_4 < T_2$).

On the other hand, for the portion of the side wall 14 facing the widthwise opposite rims of the punch hole 12a, which corresponds to the connecting portion between the flat face 21 and the inside face of the metal die piece 15, in the condition shown in FIG. 2 shearing has not yet commenced. Also concerning the plate thickness $T_3$ of this portion, this is unaltered from the condition where the expanded portion 7a where one part of the metal pipe 3 is plastically deformed in the radial outward direction has merely been formed by hydroforming such as shown in the aforementioned FIG. 20 to FIG. 23. That is, the plate thickness $T_3$ of this portion is not particularly decreased by using the slide tool 13b of the present example.

In this manner, in the case of the present example, the shape of the tip end face 20a of the slide tool 13b is devised so that the position of the tip end face 20a when executing the hydroforming process is appropriately controlled. Therefore the shearing starts from the side (lower side in FIG. 2) of the part facing the punch hole 12a at one part of the side wall 14, where the plate thickness is thick. Furthermore, the difference between the plate thickness $T_4$ and $T_3$ of the portion of the side wall 14 positioned on the widthwise opposite end portions of the punch hole 12a is kept small. That is, on completion of the hydroforming process, the plate thickness of the relatively thick portion is reduced (from $T_2$) to $T_4$. Similarly the plate thickness of the relatively thin portion is not reduced and remains at $T_3$. Therefore the plate thicknesses $T_4$ and $T_3$ of the widthwise opposite end portions can be made approximately equal ($T_4 \approx T_3$), and also it is easy to arrange the timing for completion of the shearing (easy to finish simultaneously).

Figure 3:
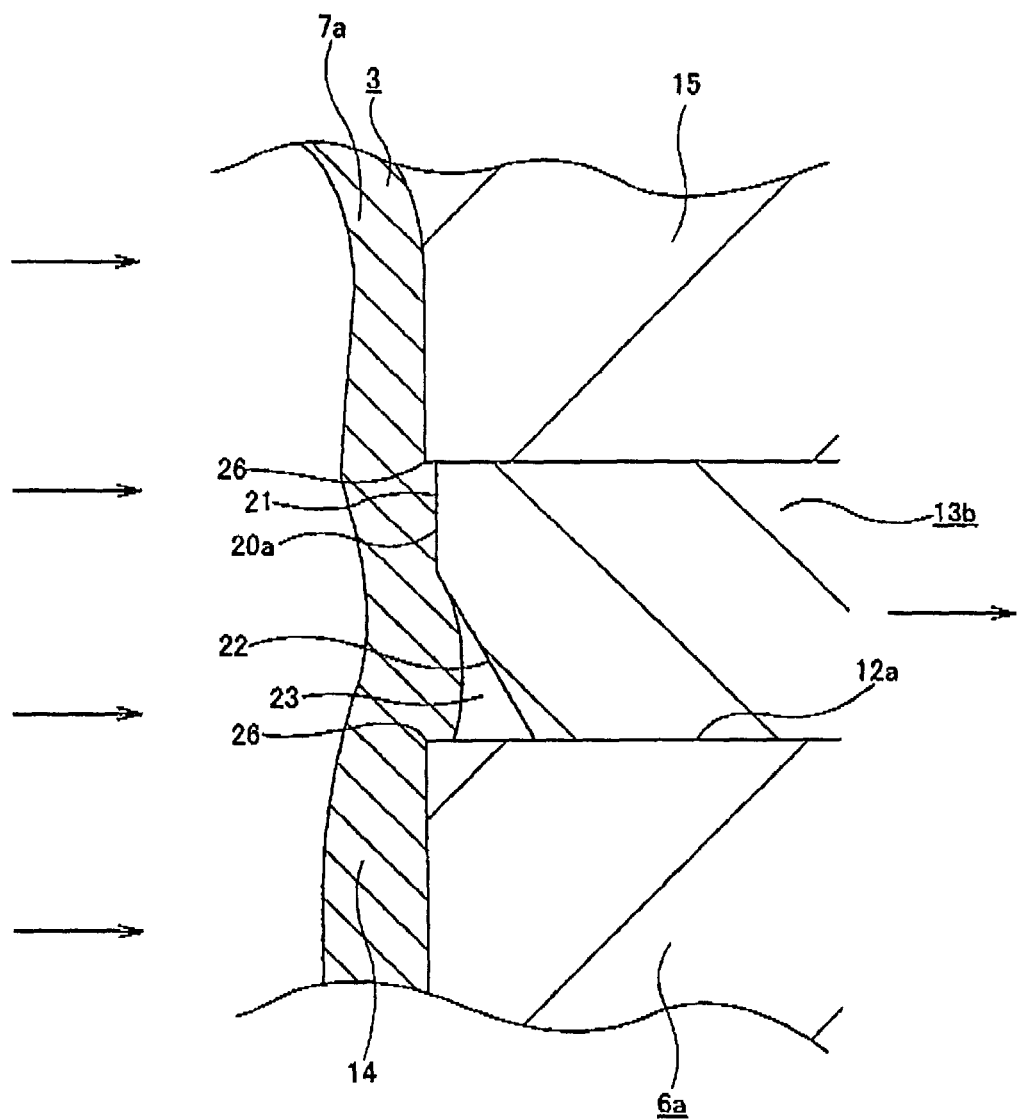
FIG. 3 is a view similar to FIG. 2, showing a part way condition of forming the through hole.
Figure 4:
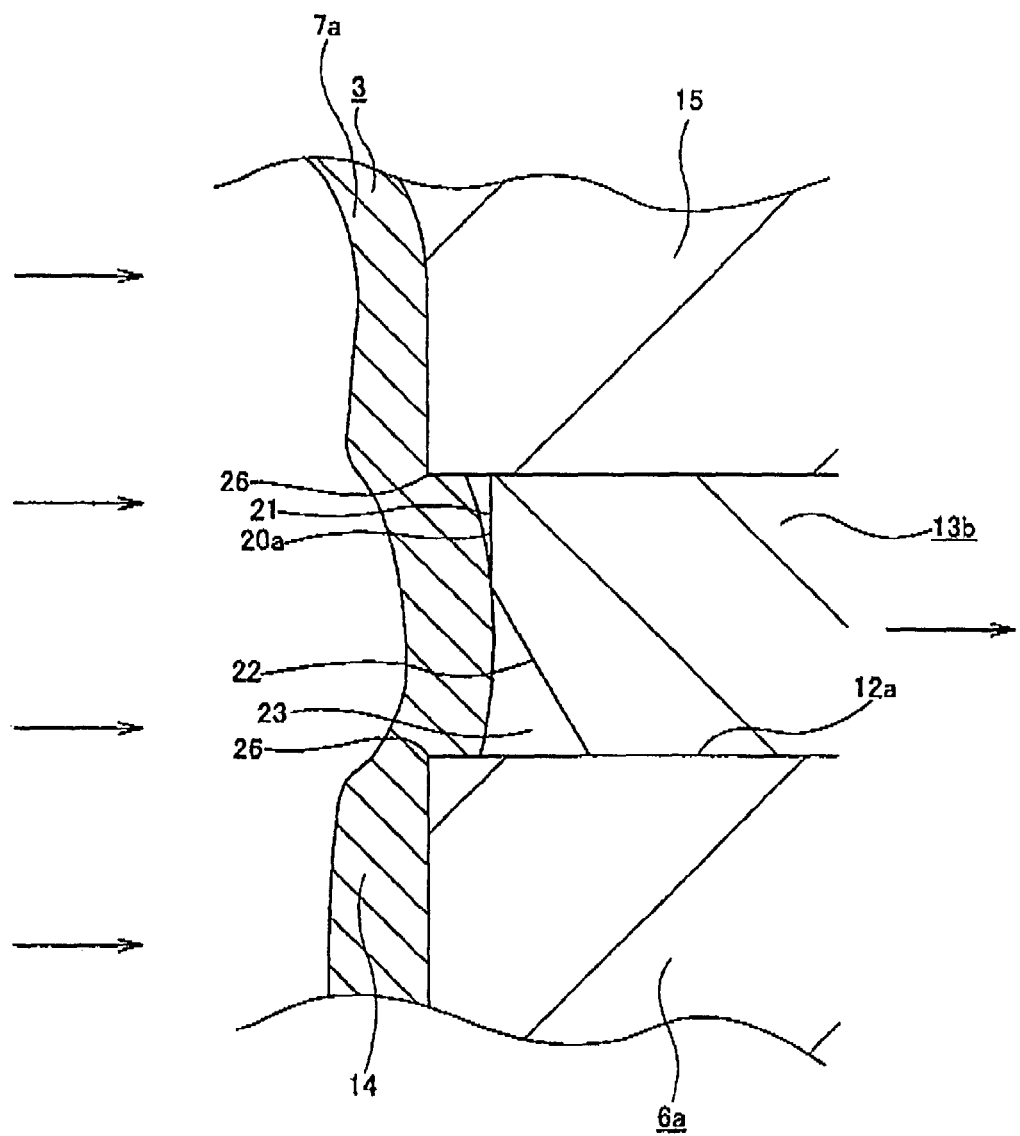
FIG. 4 is a view similar to FIG. 2, showing a subsequent condition.

Then, as shown in FIG. 3, the slide tool 13b starts to be retracted to inside the punch hole 12a. Due to this commencement of retraction, the shearing of the portions facing the punch hole 12a at one part of the side wall 14, also starts on the side where the plate thickness is thin (upper side in FIG. 3). When from this condition, the slide tool 13b is further retracted as shown in FIG. 4, the shearing proceeds at the part of the side wall 14, around the whole periphery of the part facing the punch hole 12a (the side where the thickness is thick, the side where the thickness is thin, and the part therebetween). Then, with the progress of the shearing, a crack such as shown in FIG. 1 (C) occurs approximately simultaneously around the whole perimeter of the portion facing the punch hole 12a, at one part of the side wall 14.

Figure 5:
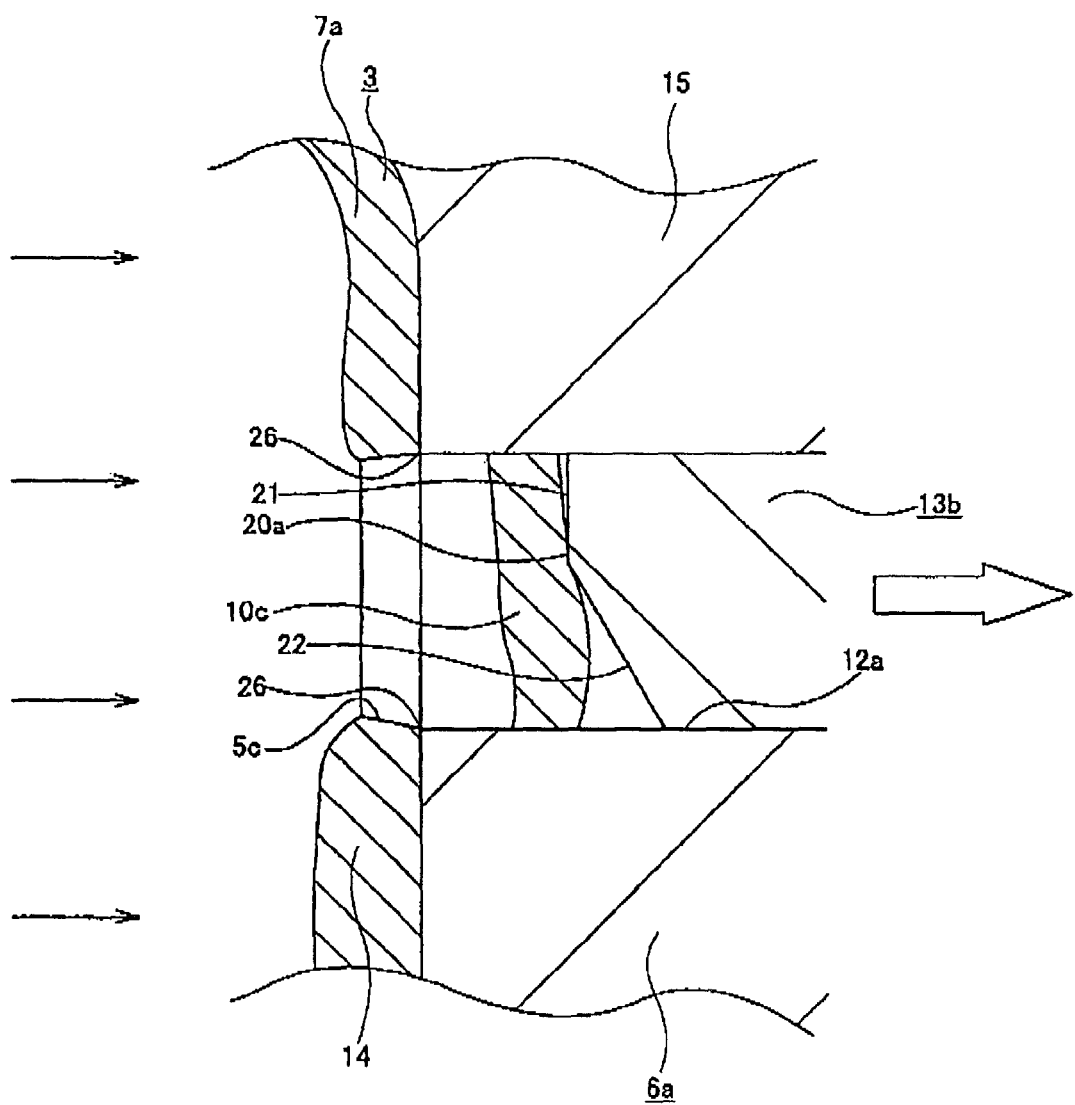
FIG. 5 is a view similar to FIG. 2, showing a condition with the through hole formed.
Figure 25:
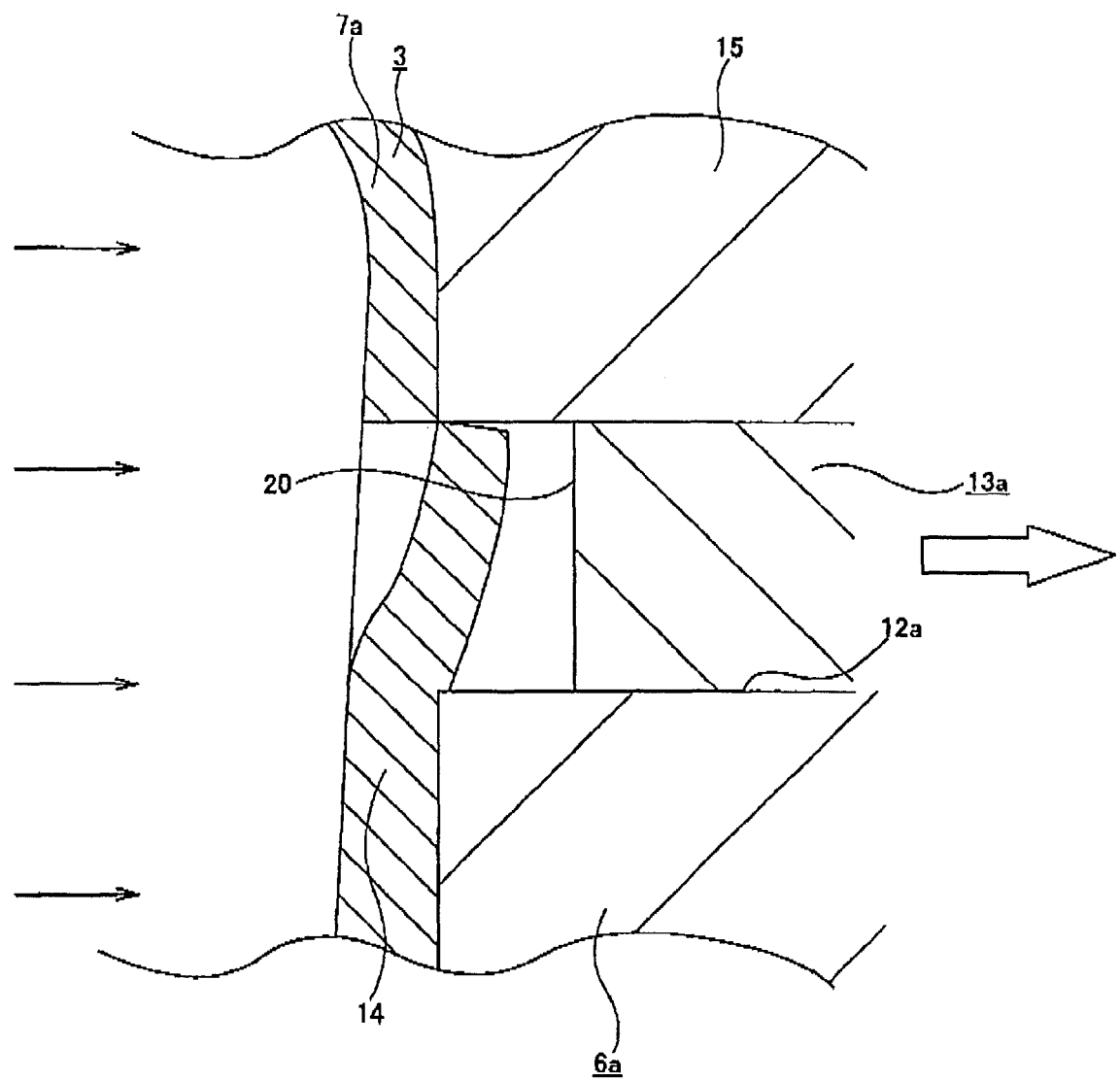
FIG. 25 is a cross-section similar to FIG. 24, for explaining the reason why a through hole is not formed by a previously considered method.

As a result, the portion facing the punch hole 12a is punched out by the hydraulic pressure existing on the inside wall portion of the side wall 14 as shown in FIG. 5 and becomes a blank 10c, and this is pushed into the punch hole 12a. At this time, the rim of the portion facing the punch hole 12a starts to rupture from the shearing. However due to the fact that the shearing starts first from the portion where the plate thickness is thick as mentioned above, and the fact that the timing for shearing completion of this portion can be easily arranged by making the thicknesses $T_4$ and $T_3$ of the rim of this portion approximately equal ($T_4 \approx T_3$) around the whole perimeter, the rupture occurs at substantially the same time around the whole perimeter of the rim, giving the blank 10c. There is no longer the aforementioned situation as shown in FIG. 25, where the portion corresponding to the punch hole 12a at one part of the side wall 14 remains in a condition connected to the side wall 14. As a result, the aforementioned through hole 5c can be reliably formed in the portion of the side wall 14 which matches with the punch hole 12a.

The blank 10c is pressed out into the punch hole 12a, so that there is no longer the situation where it remains inside the metal pipe 3 including the expanded portion 7a. Consequently, the process and apparatus for removing the blank 10c from the interior of the metal pipe 3, after forming the through hole 5c, is not necessary. Therefore, the apparatus for manufacturing products furnished with the expanded portion 7a and the through hole 5c can be made smaller (space saving), so that the cost necessary for manufacturing the product can be reduced.

In order to reliably punch out the portion where the through hole 5c is to be made, the extent of making the start of the shearing on the side where the plate thickness is thick earlier compared to the side where the plate thickness is thin, or the extent of making the plate thicknesses $T_4$ and $T_3$ on the widthwise opposite edge portions approximately equal, so that the timing for shearing completion can be easily arranged, is determined by design and experimentally for the material of the metal pipe 3, and the original plate thickness. For example, in the case where the through hole is formed in a column bracket provided integrally on a steering column made from a mild steel plate or an aluminum alloy plate or the like, by appropriately designing the shape of the tip end portion of the slide tool 13b, the timing for the commencement of shearing can be displaced. Furthermore, as mentioned above, in order to make the relationship of the plate thicknesses $T_4$ and $T_3$ of the widthwise opposite edge portions, a relationship where the timing for the shearing completion is easily arranged, the width dimension of the inclined face 22 in relation to the widthwise direction is controlled based on experimental data for the relationship between the hydraulic pressure, the material of the metal pipe 3, and the original plate thickness.

Regarding the blank 10c pushed in to inside the punch hole 12a, for example the metal pipe 3 formed with the expanded portion 7a, and then formed with the through hole 5c in the side wall 14 of the expanded portion 7a, is taken out from the die 6a constituted by the metal die piece 15, after which the slide tool 13b is advanced to push out the blank 10c from the punch hole 12, so that this is easily removed from the die 6a. Alternatively, in the case where the metal pipe 3 is made from a magnetic material such as mild steel plate, after taking out the metal pipe 3 from the die 6a, the blank 10c can be attracted to a magnet, and removed from the punch hole 12a. Furthermore, a discharge passage may be provided inside of the die 6a, which is communicated with a space outside from the punch hole 12a, and which has a size through which the blank 10c can just pass. In this case, the blank 10c which has been pressed to inside the punch hole 12a by the hydraulic pressure introduced to inside the metal pipe 3, can be ejected from the punch hole 12a by air pressure or hydraulic pressure separately introduced to inside the punch hole 12a, after the metal pipe 3 has been taken out from the die 6a. In any of these cases, the blank 10c which has been pressed in to inside the punch hole 12a accompanying the processing of the through hole 5c, is ejected from the punch hole 12a before the next processing operation.

Figure 6:
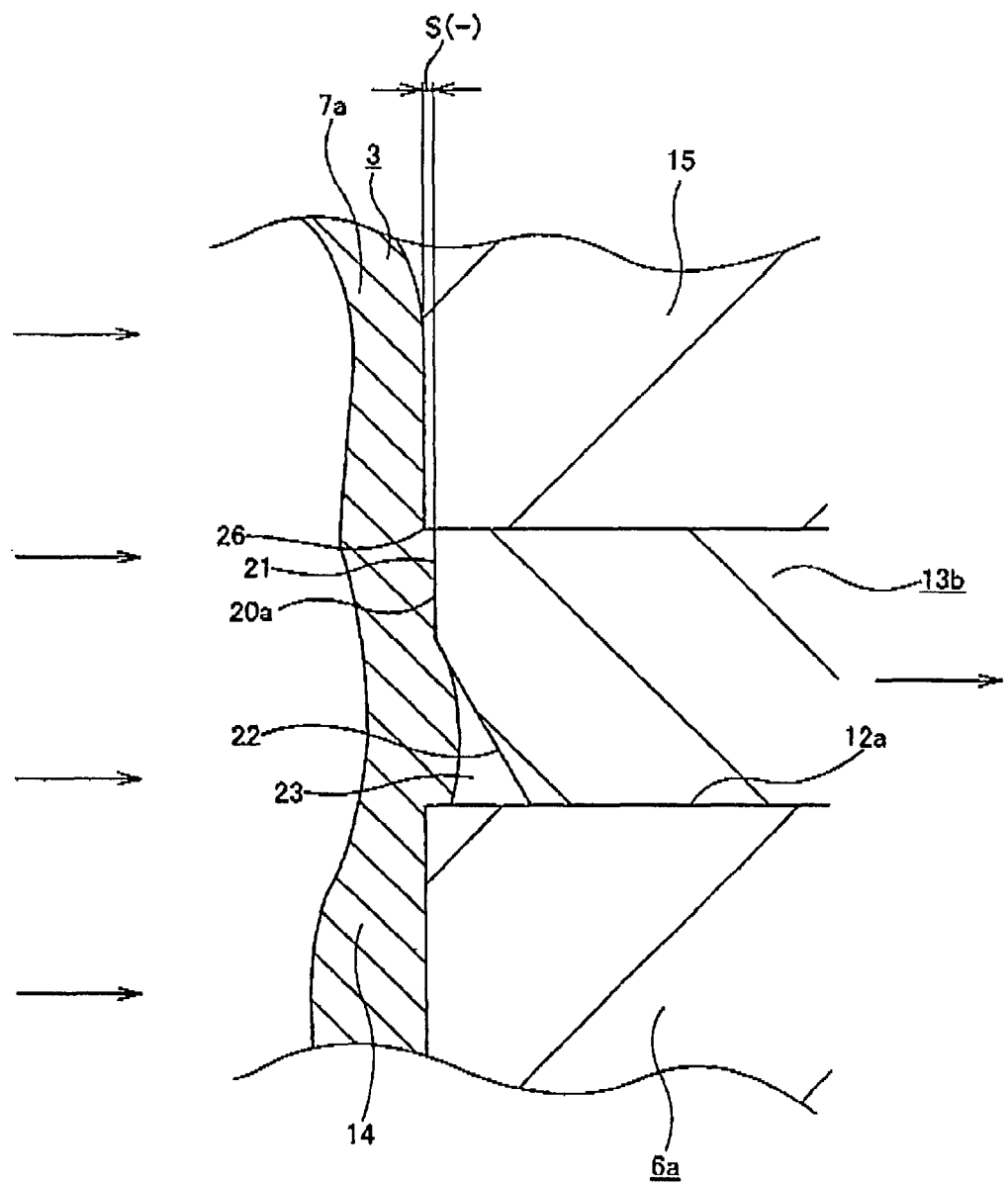
FIG. 6 is a view similar to FIG. 2, showing a modified example of the first example of the present invention.

In the case of the present example, in the initial step for the through hole forming process shown in FIG. 2, the flat face 21 of the tip end face 20a of the slide tool 13b exists at the same position as the inside face of the metal die piece 15. However, as shown in FIG. 6, the flat face 21 may exist at a position slightly recessed from the inside face. In this case, as shown in FIG. 6, compared to the condition where the flat face 21 is not recessed in from the inside face of the metal die piece 15, a portion where the plate thickness is thin is also pressed in slightly to inside the punch hole 12a. Consequently, the displacement in the timing for the start of the shearing, at the portion where the plate thickness is thick and the portion where the plate thickness is thin is reduced. Whether to adopt FIG. 2 or FIG. 6, can be determined designwise corresponding for example to the difference between the portion where the plate thickness is thick and the portion where the plate thickness is thin (conditions are set experimentally).

SECOND EXAMPLE

Figure 7:
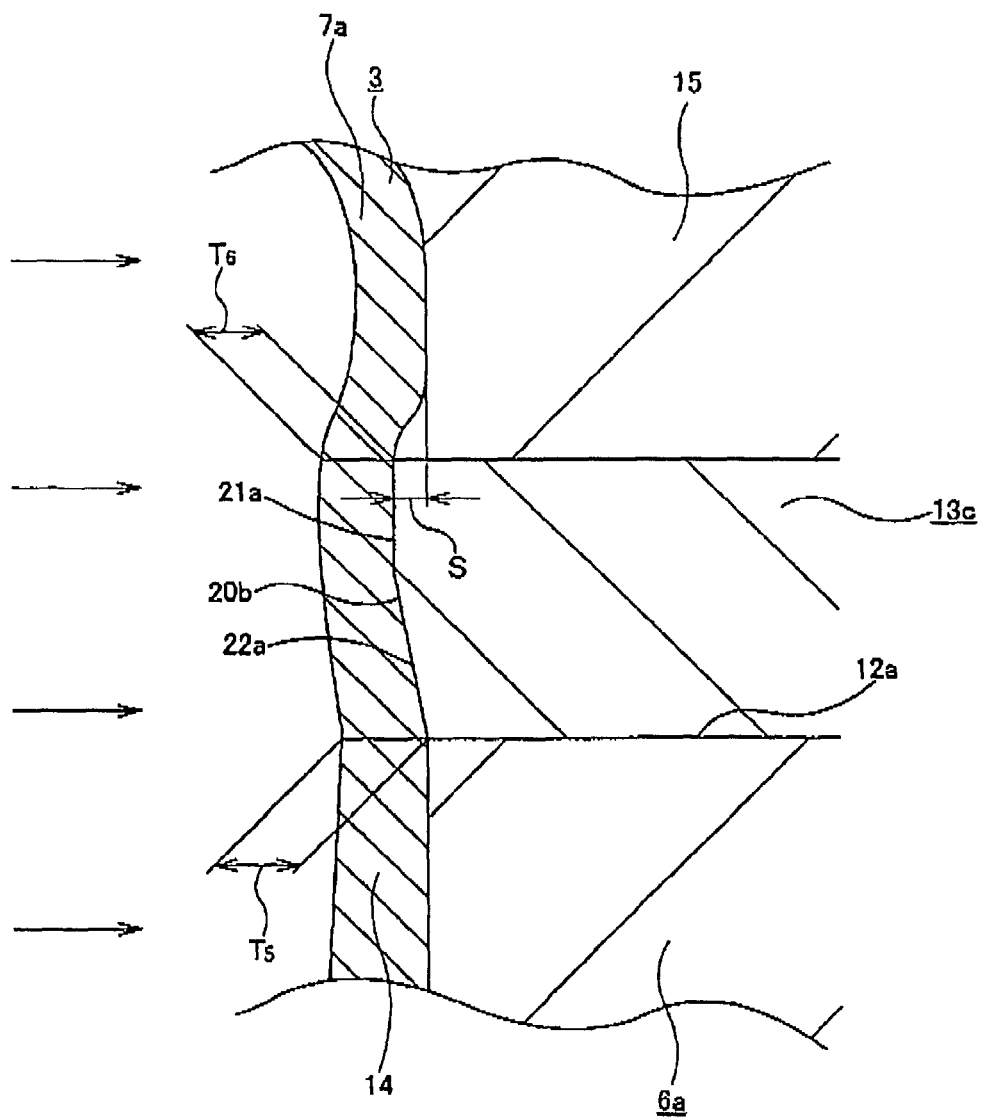
FIG. 7 is an enlarged cross-section corresponding to the portion A of FIG. 23, showing a condition before forming a through hole, in a second example of the present invention.
Figure 8:
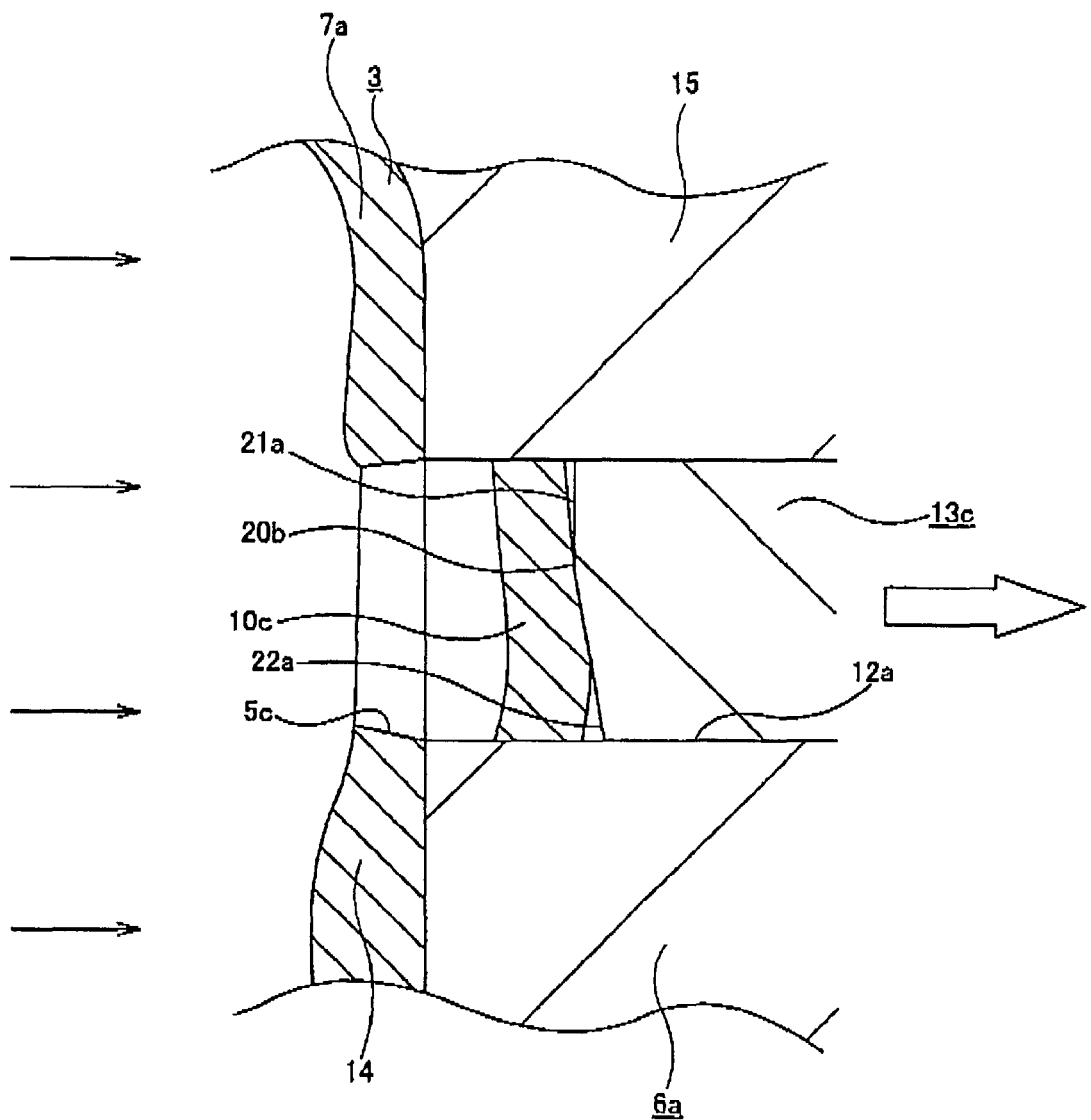
FIG. 8 is a view similar to FIG. 7, showing a condition with the through hole formed.

FIG. 7 and FIG. 8 show a second example of the present invention. Also in relation to the tip end face 20b of the slide tool 13c used in this example, similarly to the case of the first example, there is provided a flat face 21a facing the portion of the side wall 14 where the plate thickness is comparatively thin, and an inclined face 22a facing the portion where the plate thickness is comparatively thick. However, in the case of the slide tool 13c used in this example, the angle of inclination of the inclined face 22a is more gradual than that of the inclined face 22 (refer to FIG. 2 to FIG. 6) of the slide tool 13b used in the first example.

In the case of this example, in a condition with the tip end of such a slide tool 13c protruding slightly from the inside face of metal die piece 15, hydraulic pressure is introduced to the inside face of the metal tube 3, and hydroforming is carried out to plastically deform the one part of the metal tube 3 radially outward and form the expanded portion 7a. That is, the flat face 21a being the portion of the tip end face 20b of the slide tool 13c which protrudes the most, is protruded from the inside face of metal die piece 15. On the other hand, the portion of the inclined face 22a which is furthest away from the flat face 21a, being the portion of the tip end face 20b which does not protrude the most, is positioned at a portion coinciding with the inside face of metal die piece 15. Then, in this condition, hydraulic pressure is introduced to the inside of the metal tube 3 so that one part of the metal tube 3 is expanded radially outward to thereby form the expanded portion 7a.

Since the tip end portion of the slide tool 13c is protruded at one portion of the inside face of metal die piece 15, then in a condition with the expanded portion 7a formed, the part of the side wall 14 constituting this expanded portion 7a is bent along the tip end portion of the slide tool 13c as shown in FIG. 7. That is, the portion of the sidewall 14 which is abutted with the flat face 21a, is in a condition separated the most from the inside face of metal die piece 15, and the portion abutted with the inclined face 22a is inclined along the inclined face 22a, being inclined in a direction such that the distance from the inside face of metal die piece 15 increases towards the flat face 21a.

Then, from this condition, as shown in FIG. 8, if the slide tool 13c is displaced on the inside face of the punch hole 12a in a direction to withdraw from the sidewall 14, the portion at one part of the sidewall 14, which coincides with the punch hole 12a is torn and broken around the whole perimeter of the punch hole 12a to thereby form a through hole 5c corresponding to the punch hole 12a.

In the case of this example, for the following reasons, the portion at one part of the sidewall 14, which coincides with the punch hole 12a is ruptured around the whole perimeter of the punch hole 12a. At first, in order to form the expanded portion 7a, hydraulic pressure is applied to the inside of the metal tube 3, and in the final stage of the process for forming the expanded portion 7a, the one part of the sidewall 14 of the expanded portion 7a is pushed on the tip end portion of the slide tool 13c, and this portion is deformed along the tip end portion. More specifically, of the portions corresponding to the opposite edges of the portion where the through hole 5c is to be formed at one part of the sidewall 14, the portion on the side where the plate thickness is thin (the upper side in FIG. 7) is deformed (bent back) by a comparatively large amount in the opposite direction to the direction that it is deformed when forming the through hole 5c by retracting the slide tool 13c. In this condition, the plate thickness of the portion which is bent back greatly in this manner becomes $T_6$. On the other hand the portion on the side where the plate thickness is relatively thick (the lower side in FIG. 7), is deformed in the opposite direction to the direction that it is deformed when forming the through hole 5c, however this deformation amount is kept insignificant so that the plate thickness of this portion becomes $T_5$.

Then, when from the condition where the portion where the through hole 5c is to be formed at the part of the sidewall 14c, is deformed as described above, the slide tool 13c is withdrawn a little inside of the punch hole 12a to the extent shown in FIG. 2 showing the first example, the shearing starts immediately as shown in FIG. 2 at the portion of the comparatively large plate thickness $T_5$. In contrast to this, the shearing has not yet started at the portion of the comparatively thin plate thickness $T_6$. Rather, the portion of the comparatively thin plate thickness is compressed in the perpendicular direction to the shear face so that a compressive stress is applied, giving a condition where the crack is unlikely to occur. When from this condition the slide tool 13c is further retracted a little inside of the punch hole 12a to the extent shown in FIG. 3, showing the first example, then also at the portion of the comparatively thin plate thickness $T_6$, the shearing commences. Then, when the slide tool 13c is withdrawn further via the condition of FIG. 4 showing the first example, then as shown in FIG. 8, the shearing progresses around the whole perimeter (the portion of comparatively thick plate thickness $T_5$, the portion of comparatively thin thickness $T_6$, and the portion in therebetween) of the portion facing to the punch hole 12a, at the part of the sidewall 14. Then, accompanying the progress of this shearing, a crack occurs as shown in FIG. 1 (C) approximately simultaneously around the whole perimeter of the portion facing the punch hole 12a, at one part of the sidewall 14.

As a result, the portion corresponding to the punch hole 12a becomes a blank 10c as shown in FIG. 8 which is punched out by the hydraulic pressure existing on the inside portion of the sidewall 14, and is pushed in to inside the punch hole 12a. In the occurrence of the crack approximately simultaneously around the whole perimeter of the portion facing the punch hole 12a, at one part of the sidewall 14, it is also considered that the small difference of the thicknesses of the respective portions contributes to this, in addition to the fact that the timing for the starting for the above shearing is displaced. That is, as shown in FIG. 7, when the slide tool 13c is withdrawn inside the punch hole 12a from the sidewall 14, the portion of the sidewall 14, corresponding to the punch hole 12a is pushed in to inside the punch hole 12a. At this time, the portion having the relatively thick plate thickness $T_5$ starts to immediately be pressed into the punch hole 12a. On the other hand, the portion where the plate thickness $T_6$ is thin is deformed until it once become parallel with the other portion, and is then pressed into the punch hole 12a. Then, in the process of deforming the portion where the plate thickness $T_6$ is thin until it once becomes parallel with the other portion, and then pressing into the punch hole, a compressive stress is applied to this portion and at the same time the plate thickness of this portion is slightly increased (becomes greater than $T_6$). As a result, the portion of the sidewall 14 facing to the punch hole 12a is pushed to inside of the punch hole 12a while rupturing around the whole perimeter of the rim of the punch hole 12a, to thereby form the through hole 5c.

In the case of this example, at the stage of forming the expanded portion 7a as in FIG. 7, the end of the inclined face 22a of the tip end face 20b of the slide tool 13c on the side far from the flat face 21a may be positioned at a portion slightly recessed from the inside face of metal die piece 15. In this case, compared to the situation shown in the figure where this portion is not recessed in from the inside face of metal die piece 15, the portion of the sidewall 14 of the expanded portion 7a which abuts against this portion is pushed slightly to inside of the punch hole 12a, and hence the start of the shearing at this portion becomes earlier, and also the plate thickness of this portion tends to become slightly thinner.

In any of the cases, in a condition where the expanded portion 7a is formed with one part of the metal tube 3 expanded as shown in FIG. 7, and with the tip end face 20b of the slide tool 13c abutted against one part of the sidewall 14 of the expanded portion 7a, if the difference in the thicknesses $T_5$ and $T_6$ of the portions of the sidewall 14 which correspond to the widthwise opposite edges of the punch hole 12a, when viewed from the side where the plate thickness is large, is preferably within 30% and more preferably within 20%, then there is not likely to be any special problem in forming the through hole 5c. That is, the manufacturing method of this example is appropriate for the case where the difference in the plate thicknesses is larger than for the case of the aforementioned first example. Furthermore, the edge portion of the tip end face 20b which is most recessed, and which is farthest on the inclined face 22a from the flat face 21a may be made to coincide with the inside face of metal die piece 15 as shown in the figure, or may be positioned at a portion which is recessed slightly more as mentioned above, or may even be slightly protruded from the inside face.

THIRD EXAMPLE

Figure 9:
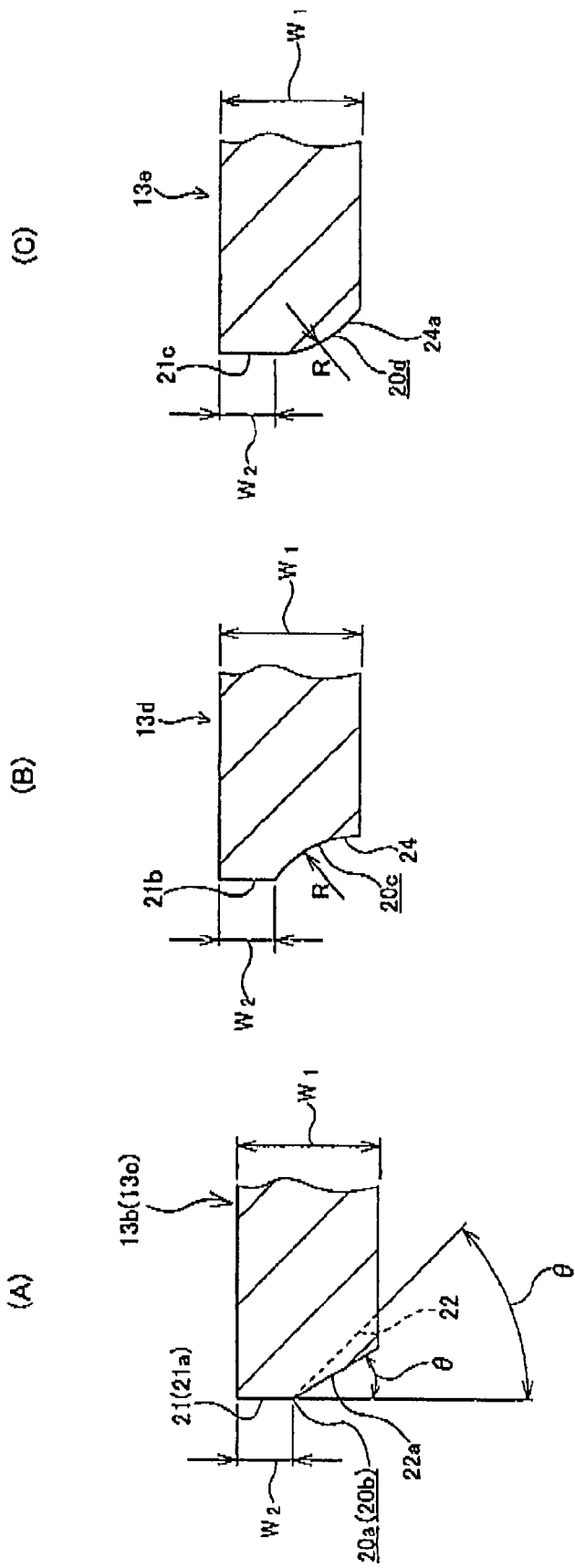
FIG. 9 is a cross-section showing a third example of a slide tool for forming the through hole, as a third example of the present invention.

FIG. 9, as a third example of the present invention, shows slide tools 13b and 13c used in the aforementioned first example and second example, and two examples of slide tools which can be substituted for these slide tools 13b and 13c, giving a total of three examples of slide tools. That is, the shape of the tip end portion of the slide tool used in the case of forming the through hole 5c as in the aforementioned two examples, is not limited to the slide tool 13b (13c) shown in FIG. 9 (A), provided with the inclined faces 22 and 22a with the straight line cross-section shape, and as shown in FIG. 9 (B) and (C), this may be one provided with an inclined face 24 or 24a of a curved shape where the cross-section shape is a circular arc. Moreover, although not shown in the figure, this may be a composite surface where the straight line and the curve of the cross-section shape of the inclined faces are combined. As shown by the broken line in FIG. 9 (A), the incline angle θ of the inclined face 22 (22a) formed on the tip end face 20a (20b) of the slide tool 13b (13c) may be change at the central portion in the lengthwise direction (direction into and out of the page in FIG. 9) of the tip end face 20a (20b). This consideration is necessary in the case where the wall thickness of the part where the through hole is to be formed by hydropiercing changes not only in the widthwise direction of the through hole, but also in the lengthwise direction. In this case, instead of changing the incline angle θ of the inclined face 22 (22a), the width $W_2$ of the flat face 21 (21a) may be changed, or both may be changed. In this manner, depending on the form of the wall thickness distribution of the material, the shape of the tip end face 20a (20b) can be changed three-dimensionally as required.

FIG. 9 (A) shows a slide tool 13b (13c) used in the first example and second example. The dimensions of this slide tool 13b (13c) are controlled, for example in the following manner. That is, if the width of the slide tool 13b (13c) is $W_1$, and the width of the flat face 21 (21a) of the tip end face 20a (20b) of the slide tool 13b (13c) is $W_2$, and the inclination angle of the inclined face 22 (22a) is θ, then the following range can be adopted;

$0 \leq W_2 \leq 0.9 W_1$ $0.3° \leq θ < 90°$

Preferably, these are set in the range;

$0.01 W_1 \leq W_2 \leq 0.9 W_1$ $0.3° \leq θ < 90°$ more preferably in the range;

$0.2 W_1 \leq W_2 \leq 0.8 W_1$ $1° \leq θ \leq 20°$ and even more preferably in the range;

$0.2 W_1 \leq W_2 \leq 0.7 W_1$ $3° \leq θ \leq 20°$.

In short, the width $W_1$ of the slide tool 13b (13c) is determined to correspond to the width of the through hole 5c which is to be formed. However, concerning the remaining width $W_2$ and the inclination angle θ, appropriate values are selected experimentally corresponding to the material and the plate thickness of the metal tube 3. If the width $W_2$ of the flat face 21 (21a) is too wide, the regulatory effect of the timing of shearing commencement and the timing for cracking causing rupture due to protrusion of the flat face 21 (21a) is difficult to obtain sufficiently. On the other hand, if the width $W_2$ is too small, it is difficult to ensure the mechanical strength of the flat face 21. Consequently, if there is no problem from the aspect of ensuring the mechanical strength of the slide tool, the flat face 21 may be omitted. Also for the inclination angle θ, if this is too small, the regulatory effect of the respective timings due to withdrawal of the slide tool 13b (13c) is difficult to obtain. Conversely, in the case where the inclination angle θ is too large, not only is it difficult to ensure the mechanical strength of the flat face 21 (21a), but also the thick wall side is likely to be excessively sheared, so that it is difficult to adjust the respective timings.

In FIG. 9 (B) and (C) incline portions 24 and 24a of a concave face (in the case of FIG. 9 (B)) or a convex face (in the case of FIG. 9 (C)) of a partial cylindrical face shape for which the radius of curvature of the cross-section shape is R, are formed instead of the inclined face 22 (22a). However, also in relation to the slide tools 13d and 13e formed with such inclined portions 24 and 24a, the dimensions of the respective portions are selected from the following ranges.

That is, if the width of the slide tools 13d and 13e is $W_1$, and the width of the flat faces 21b and 21c of the tip end faces 20 and 20d of the respective slide tools 13d and 13e is $W_2$, then these can be set within the range of;

$0 \leq W_2 \leq 0.9 W_1$ and more preferably $0.01 W_1 \leq W_2 \leq 0.9 W_1$, and the value for the radius of curvature R of the cross-section shape of the inclined portions 24 and 24a can be optionally set. For each of these values, an optimal value can be selected by experiment corresponding to the material and plate thickness of the metal tube 3, in the same manner as for the case of the slide tool 13b (13c) shown in FIG. 9 (A).

In short, in executing the present invention, when the slide tool is withdrawn on the inside of the punch hole, even if there is a difference in the plate thickness as with the side wall of the expanded portion, if the slide tool has a tip end shape such that the portion facing the punch hole can be ruptured simultaneously around the whole perimeter, by for example making the difference in the plate thickness at the two sides of the punch hole small, this can be used for executing the present invention.

Furthermore, preferably a protrusion amount S (FIG. 7) or a recess amount −S (FIG. 6) from the inside face of metal die piece 15, of the tip end face 20a, 20b of the slide tool 13b, 13c is controlled to be within the range of |T|>|S| with the thickness T (corresponding to $T_3$ of FIG. 2) of the portion of the sidewall 14 where the through hole is to be formed as a reference. If the protrusion amount S is too great, the compressive stress applied to the portion where the wall thickness is thin accompanying the retraction of the slide tool, becomes excessive, so that even if the shearing progresses, cracking does not occur. As a result, the situation arises where only the portion where the wall thickness is thick is sheared, making it difficult to realize the present invention. Furthermore, if the recess amount −S is too large, material from the initial condition excessively advances to inside the punch hole, and the effect of adjusting the respective timings corresponding to the side where the wall thickness is thick, and the side where the wall thickness is thin by the tip face shape of the slide tool, is reduced. In other words, the adjustment of the respective timings becomes difficult.

When the through hole is formed, the hydraulic pressure P acting on the one side face (the face on the opposite side to metal die piece 15) of the sidewall 14, while the slide tool is being withdrawn, is controlled so that when the shearing resistance of the metal material is r, the wall thickness is T, the circumference of the through hole is L, and the area of the though hole is S, this satisfies the relationship $P > (r \cdot T \cdot L)/S$.

FOURTH EXAMPLE

Figure 10:
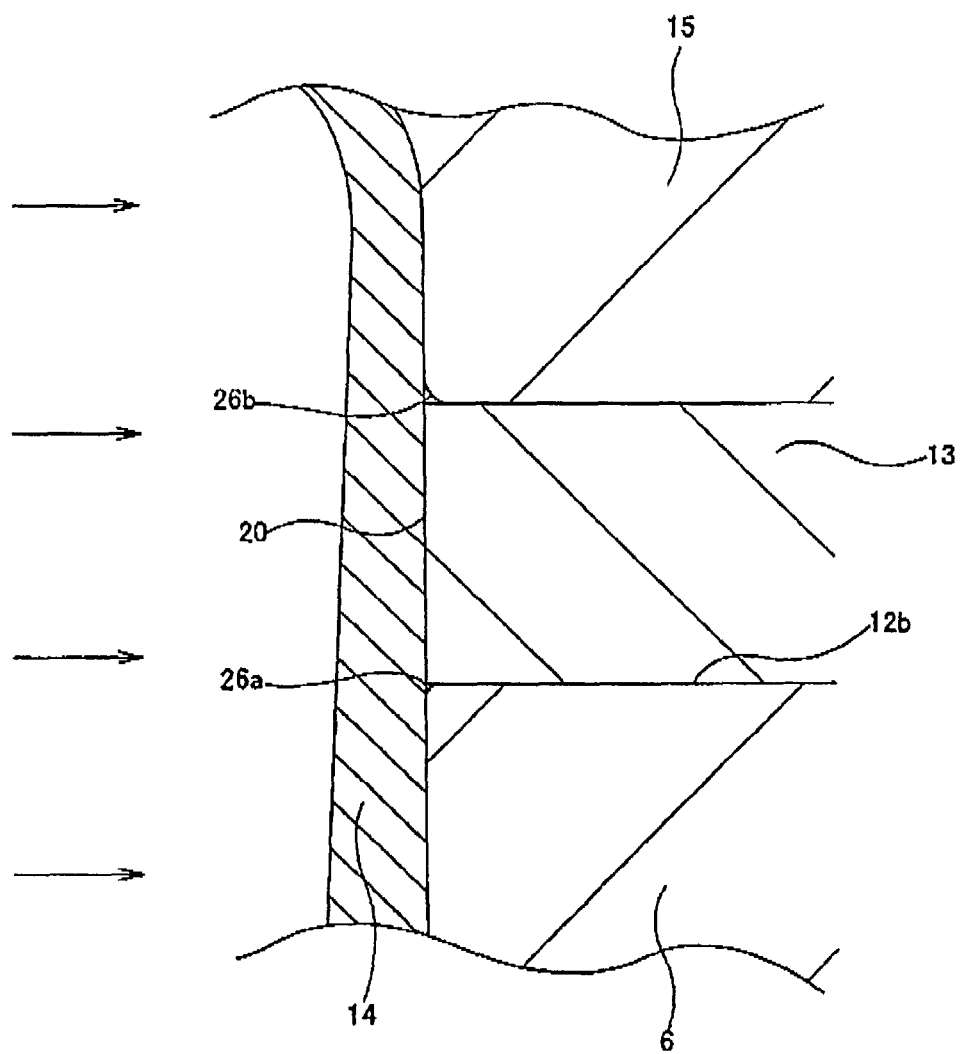
FIG. 10 is an enlarged cross-section corresponding to the portion A of FIG. 23, showing a fourth example of the present invention.

FIG. 10 shows a fourth example of the present invention. In the case of this example, the difference to the case of the examples mentioned beforehand is that the die 6 side is designed. That is, the radii of curvature of the cross-section shapes of the cutting edge portions 26a and 26b existing on the widthwise opposite edges of the opening rim of the punch hole 12b formed in the metal die piece 15 and facing the sidewall 14 in which the through hole is to be formed, are made different to each other. More specifically, the radius of curvature of the cross-section shape of the cutting edge portion 26a on the lower side of FIG. 10 for shearing the side of the sidewall 14 where the plate thickness is thick is made small (sharp edge). On the other hand, the radius of curvature of the cross-section shape of the cutting edge portion 26a on the upper side of FIG. 10 for shearing the side of the sidewall 14 where the plate thickness is thin is made comparatively large. The tip end face 20 of the slide tool 13 inserted in the punch hole 12b is flat over the whole face.

In the case of this example, by making the radius of curvature of the cross-section shape of the cutting edge portion 26b for shearing the side where the plate thickness is thin, comparatively large, the shearing on the side where the plate thickness is thin proceeds with difficulty, and the timing of cracking causing rupture on this side is delayed compared to the case where the cutting edge portion 26b is made a sharp edge. In short, in the case of this example, at the side where the timing of cracking causing rupture tends to be early due to the original plate thickness being small, this timing tends to be delayed.

Therefore, in the case of this example, even if the timing of shearing commencement is made the same for the side where the plate thickness is thin, and the side where the plate thickness is thick, the timing for cracking causing rupture (the timing for completion of the shearing phenomena) is kept approximately the same, so that irrespective if whether the plate thicknesses are dissimilar, complete inside-out hydroforming with no remaining pieces is carried out.

In combination with changing the radii of curvature of the cross-section shapes of the respective cutting edge portions 26a and 26b as with this example, the shape of the tip edge face 20 of the slide tool 13 may be designed as with the first through third examples. More specifically, on the side where the plate thickness is thin, where it is necessary to dull the sensitivity with respect to shear, the radius of curvature of the cross-section shape of the cutting edge portion is made large, and the tip end face 20 of the slide tool 13 is protruded on the inside of metal die piece 15, so that the timing of shearing commencement is delayed. On the other hand, on the side where the plate thickness is thick, the radius of curvature of the cross-section shape of the cutting edge portion is made small, and the tip end face 20 of the slide tool 13 is set back in the other direction of metal die piece 15 so that the shearing is promoted.

FIFTH EXAMPLE

Figure 11:
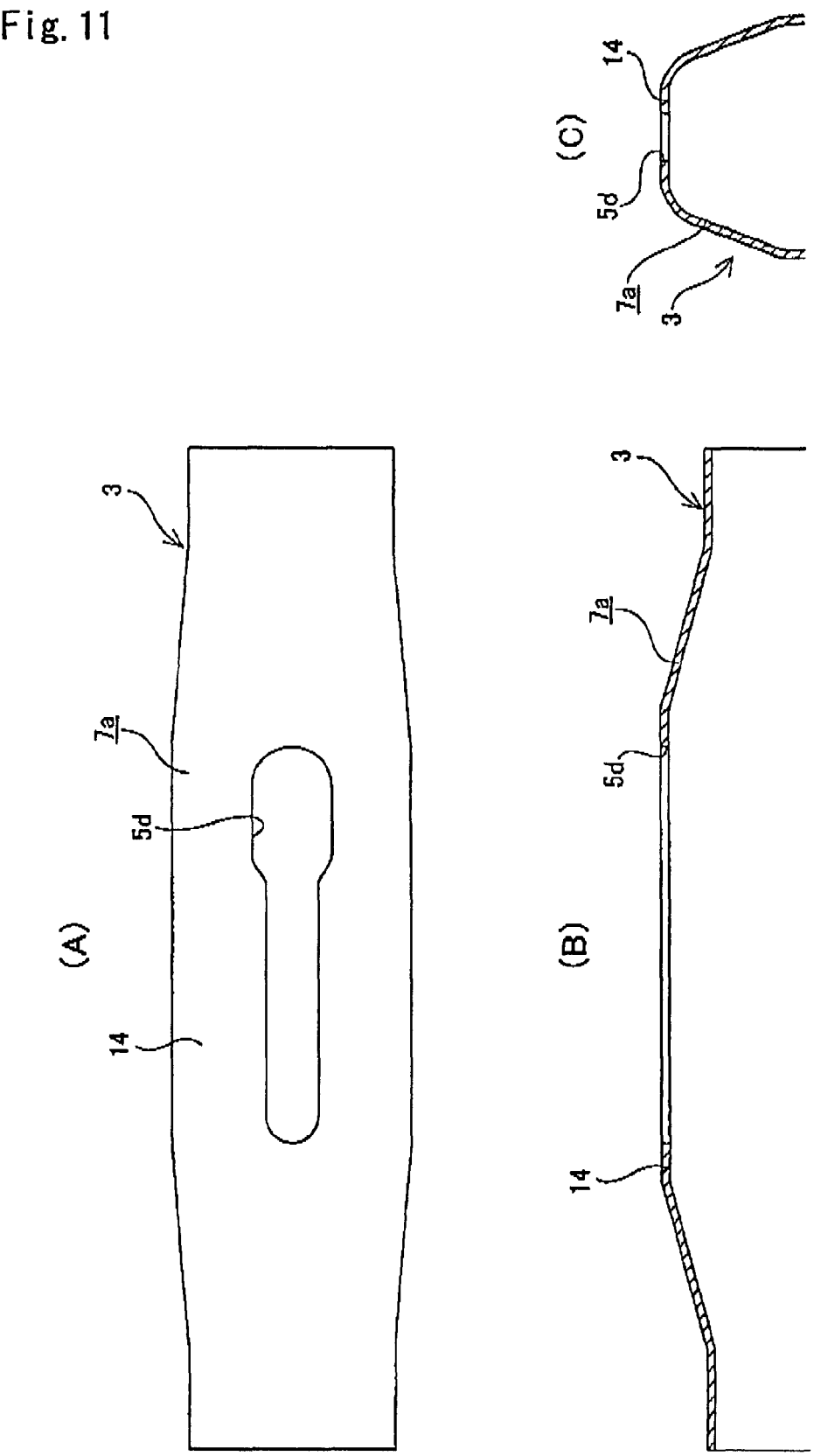
FIG. 11 shows a fifth example of the present invention, wherein (A) is a side view, and (B) and (C) are cross-sections showing the part where the through hole is formed, in conditions cut in different directions to each other.
Figure 12:
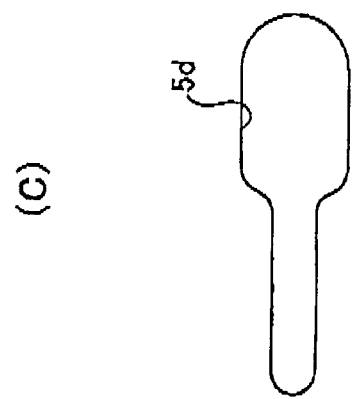
FIG. 12 is a partial side view for explaining the shape of the through hole.
Figure 12:
Figure 12:
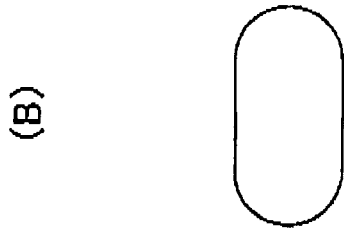
Figure 12:
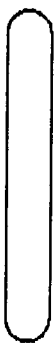

FIG. 11 and FIG. 12 show a fifth example of the present invention. In the case of this example, there is shown a case where an odd shaped through hole 5d is formed in the sidewall 14 of the expanded portion 7a formed by plastically deforming a part of the metal tube 3 in the radial outward direction by hydroforming. This through hole 5d is one where an oval shape portion with a comparatively narrow width dimension as shown in FIG. 12 (A), and an oval shape portion with a comparatively large width dimension as shown in FIG. 12 (B) are overlapped (combined) to give keyhole shape as shown in FIG. 12 (C). However, this keyhole shape through hole 5d is processed in one action by a slide tool with a cross-section shape of a keyhole. The tip end face shape of the slide tool is formed by combining one or other of the examples described previously. Also with such a keyhole shape through hole 5d, this can of course be processed in the case where the plate thickness is uniform, and if the present invention is applied, even if the plate thickness is non-uniform, irrespective of whether the metal member is an annular shape or a plate shape, this can be reliably processed by hydropiercing. The shape of the portion where the through hole 5d is to be formed in one part of the metal member, can be any shape such as a flat face, a partial circular arc face, or a curved face (the tip end face of the slide tool is matched with this).

SIXTH EXAMPLE

Figure 13:
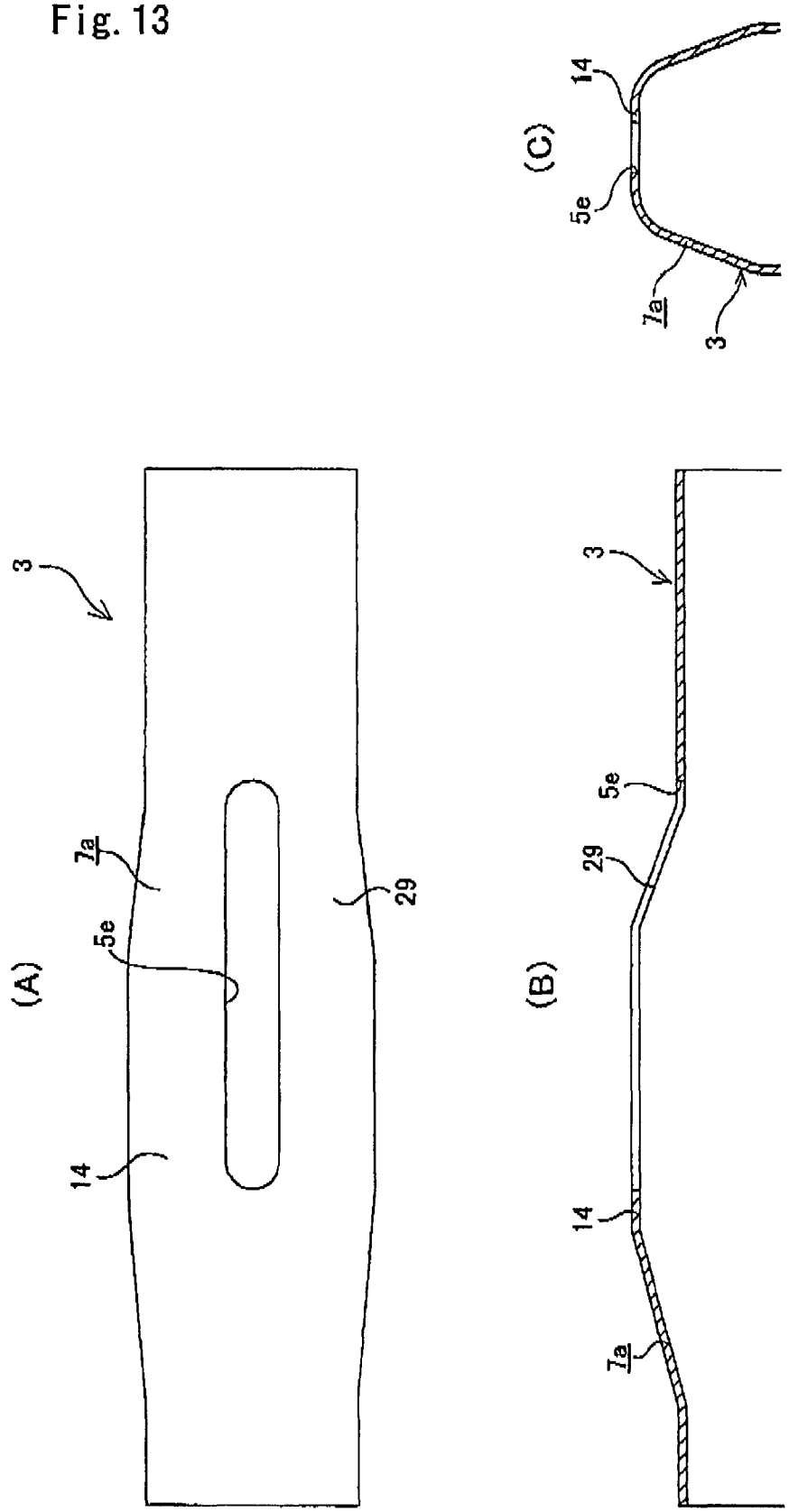
FIG. 13 is a view similar to FIG. 1, showing a sixth example of the present invention.

FIG. 13 shows a sixth example of the present invention. In the case of this example, there is shown a case where, in the sidewall 14 of the expanded portion 7a which is formed by plastically deforming one part of the metal tube 3 in the radial outward direction by hydroforming, there is formed a through hole 5e with a large aspect ratio (slit shape) with an inclined portion 29 of the expanded portion 7a in a straddled condition. In the case of this example, the tip end face shape of the slide tool is matched with any of the previously described examples, and is formed to match with the outer face shape of the sidewall 14 where the through hole 5e is to be formed. Also for such a slit shape through hole 5e existing in a condition straddling the inclined portion 29, similarly to the aforementioned fifth example, this can be reliably processed by hydropiercing by applying the present invention.

SEVENTH EXAMPLE

Figure 14:
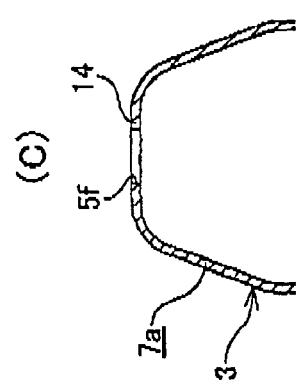
FIG. 14 is a view similar to FIG. 11, showing a seventh example of the present invention.
Figure 14:
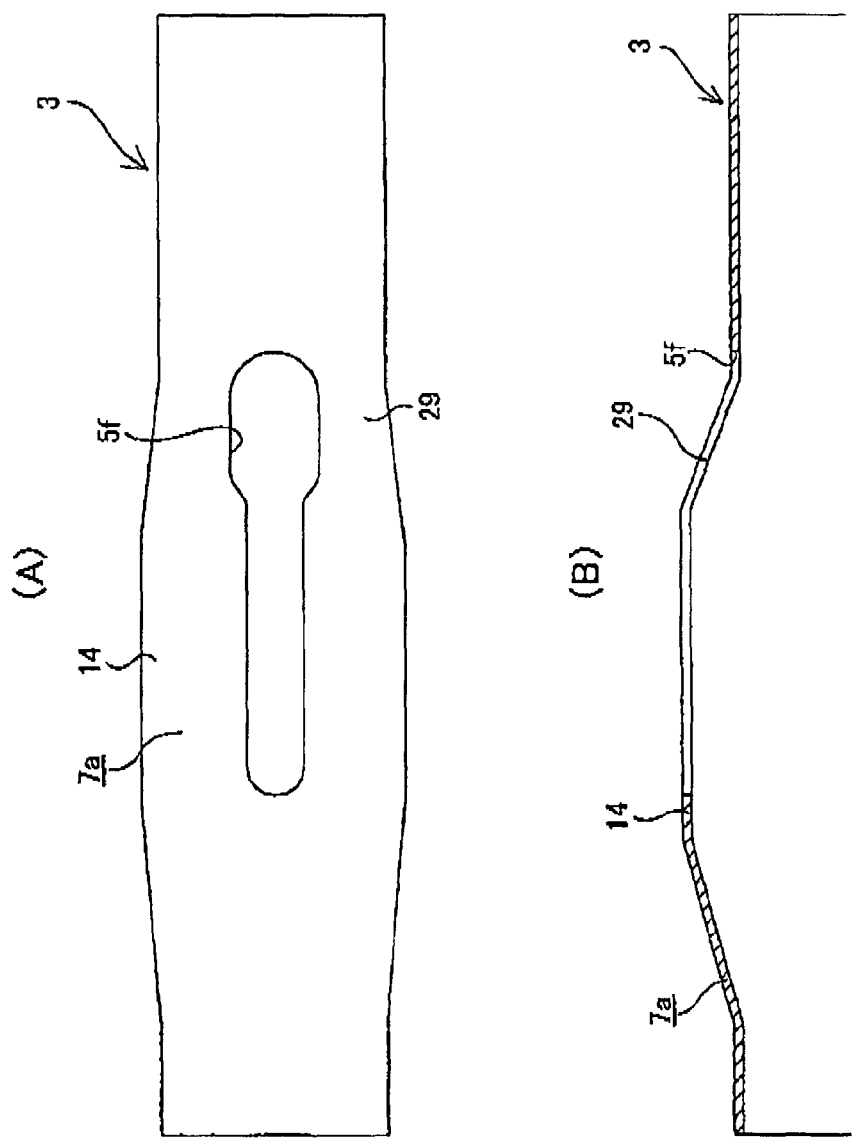

FIG. 14 shows a seventh example of the present invention. In the case of this example, there is shown a case where, in the sidewall 14 of the expanded portion 7a which is formed by plastically deforming one part of the metal tube 3 in a radial outward direction by hydroforming, there is formed a keyhole shape through hole 5 with the inclined portion 29 of the expanded portion 7a in a straddled condition. In the case of this example also, the tip end face of the slide tool is matched with any of the previously described examples, and is formed to match with the outer face shape of the sidewall 14 where the through hole 5f is to be formed. Also in such a keyhole shape through hole 5f existing in a condition straddling the inclined portion 29, similarly to the aforementioned fifth and sixth examples, this can be reliably processed by hydropiercing by applying the present invention.

EIGHTH EXAMPLE

Figure 17:
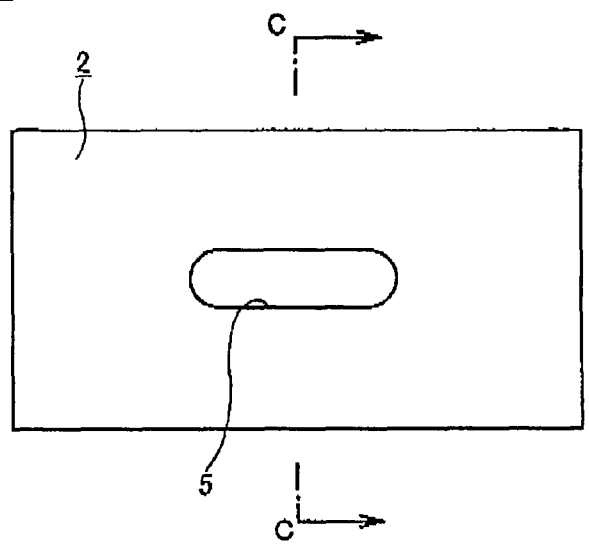
FIG. 17 is a view on the arrow B of FIG. 16.
Figure 18:
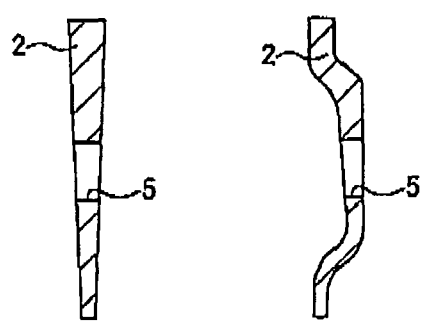
FIG. 18 is a cross-section on C-C of FIG. 17, wherein (A) shows a side wall portion of the column bracket, and (B) shows a condition where the side wall portion is further expanded.
Figure 19:
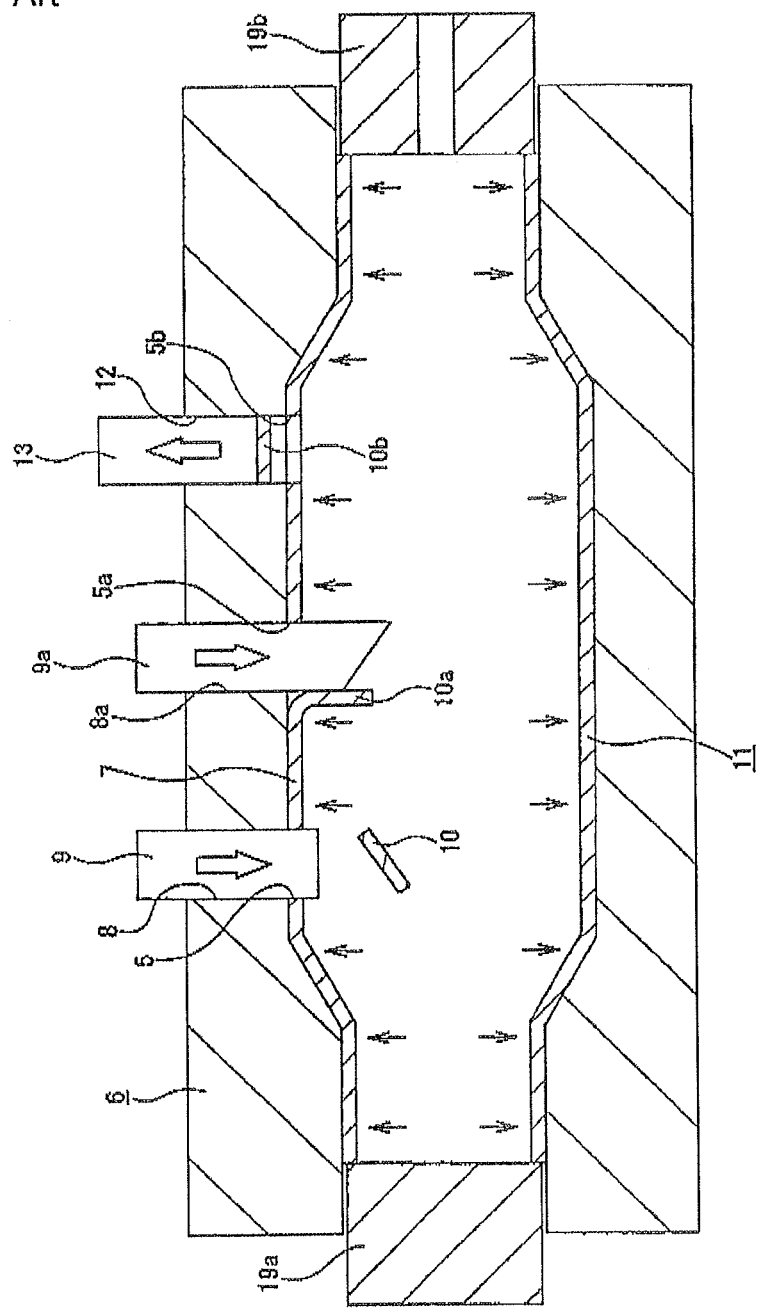
FIG. 19 is a cross-section showing a third example of a method of forming a through hole in an expanded portion made by plastically deforming a metal tube.
Figure 20:
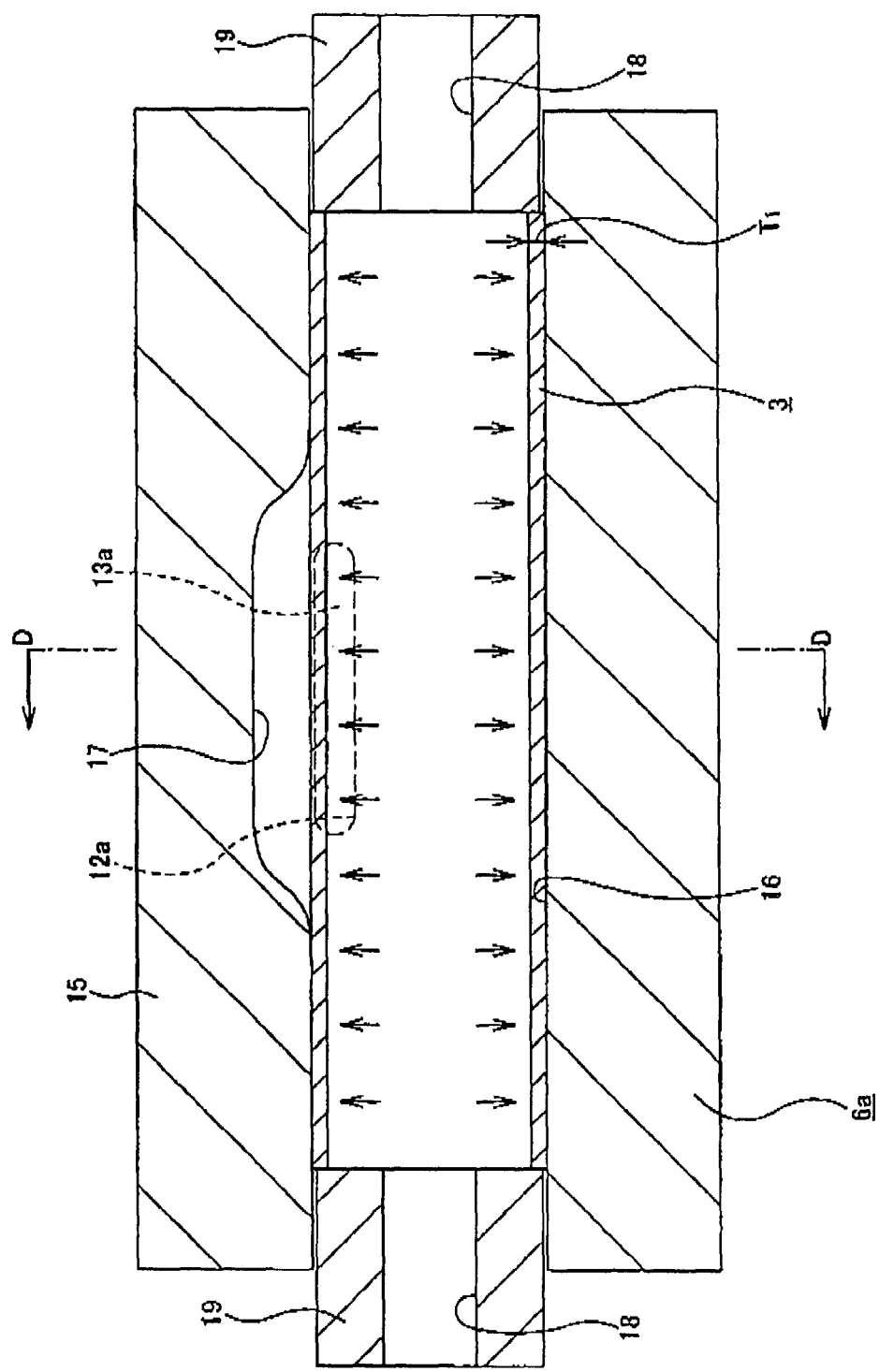
FIG. 20 is a cross-section showing preparation steps for a method of forming an expanded portion in a metal tube, and then forming a through hole in this expanded portion, which was previously considered.
Figure 21:
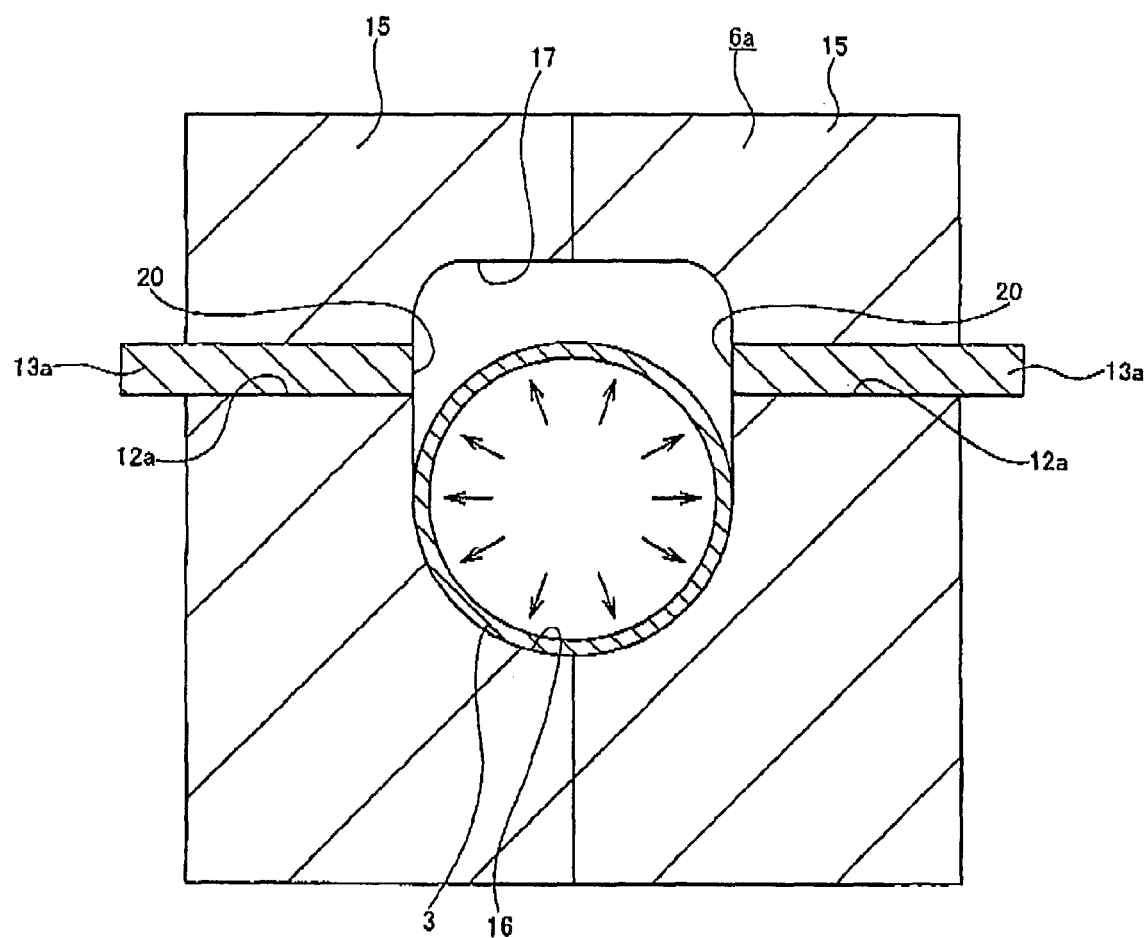
FIG. 21 is a cross-section on D-D of FIG. 20.
Figure 22:
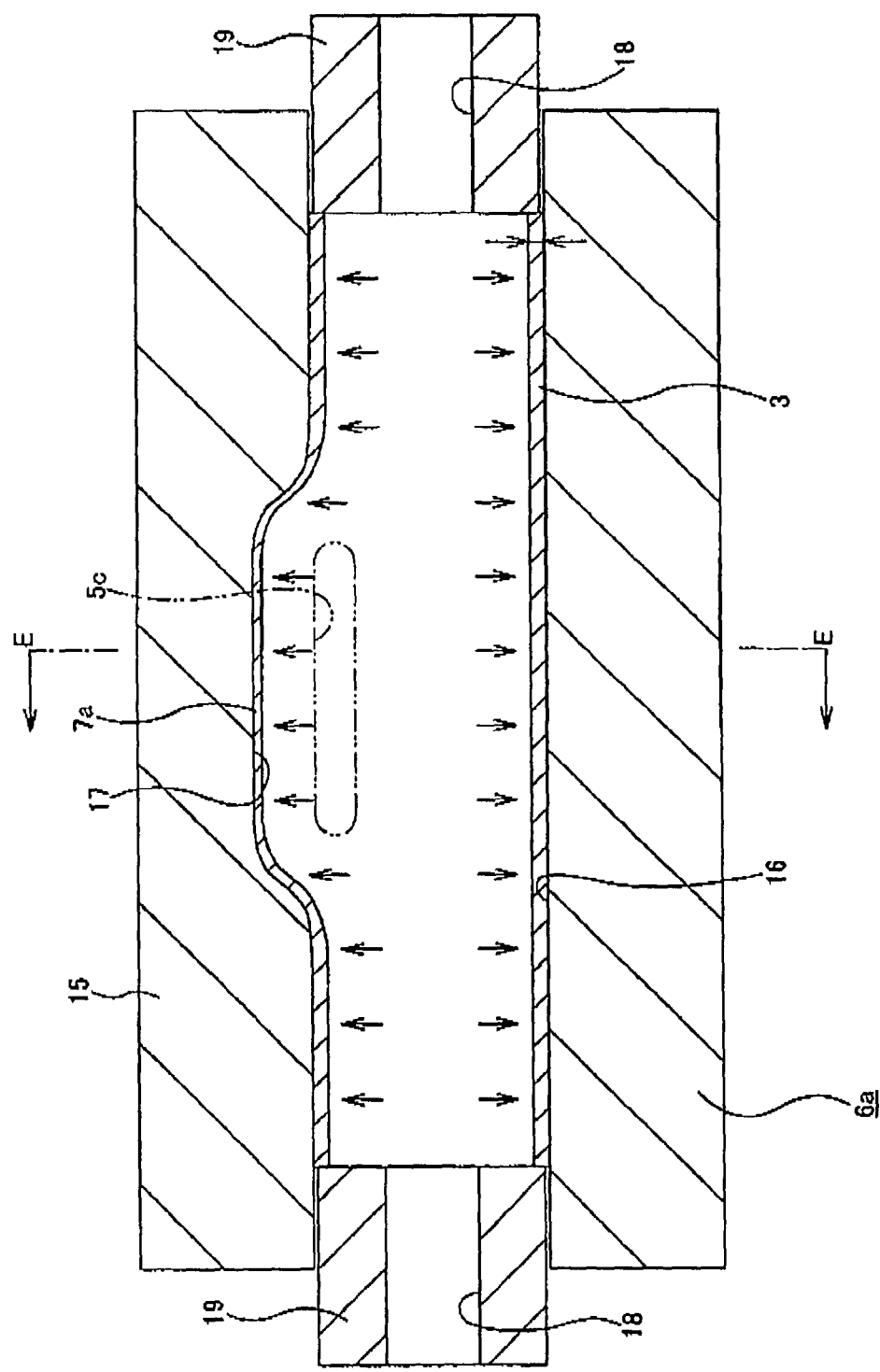
FIG. 22 is a cross-section showing a condition where an expanded portion is formed in the metal tube.

An experiment carried out in order to confirm the effectiveness of the present invention, will be described. Actual hydroforming and hydropiercing was carried out by the method of the second example shown in FIG. 7 and FIG. 8. That is, the manufacture of a steering column outer tube formed with an integral bracket was assumed, and an expanded portion was formed on an axial intermediate portion of the metal tube by hydroforming, and then continuing on in the same die, a through hole of an oval shape was formed in the side wall portion of both sides of the extended portion by hydropiercing (refer to FIG. 15 to FIG. 17). For the slide tool combined with the die, one of a shape as shown in FIG. 9 (A), with the tip face formed as a flat face and an inclined face was used.

The metal tube used in the experiment was carbon steel tube for machine structural purposes (STKMI IA; JIS G3445) with an outside diameter of 60.5 mm, a wall thickness of 2.0 mm, and an overall length of 500 mm. The mechanical test values for this material were; yield strength 300 MPa, tensile strength 400 MPa, and elongation 40%. The size of the oval shape punch hole for forming the through hole was; length in the major axis direction 60 mm, and length in the minor axis direction 10 mm.

The tube expansion proportion at the expanded portion formed by hydroforming was 30%, and the plate thickness was 1.8 mm on the small side and 2.0 mm on the large side. In order to form the oval shape through hole in the sidewall portion on both sides of the expanded portion by hydropiercing, the relationship of the width $W_1$ of the tip end face of the slide tool to the width $W_2$ of the flat face (land width ratio $W_2/W_1$), the inclination angle $\theta$ between the inclined face and the flat face, and the protrusion amount S of the flat face at the initial position were variously changed. These values are shown together with experimental results in the following Table 1. The comparative examples in Table 1 are for the case where, for the slide tool, one where the tip end face was a flat face over the whole face was used.

TABLE 1

| | Inclination angle $\theta$ | Land width ratio $W_2/W_1$ | Protrusion amount S | Through hole form result |
| --- | --- | --- | --- | --- |
| Present invention | 3 | 0.5 | 0 | Good |

TABLE 1-continued

| | Inclination angle θ | Land width ratio $W_2/W_1$ | Protrusion amount S | Through hole form result |
|---|---|---|---|---|
| Present invention | 15 | 0.5 | 0 | Good |
| Present invention | 3 | 0.5 | 0.5 | Good |
| Present invention | 15 | 0.5 | 0.5 | Good |
| Present invention | 3 | 0 | 0 | Good |
| Present invention* | 30 | 0 | 0 | Good |
| Comparative example | 0 | — | 0 | Remaining thick portion |
| Comparative example | 0 | — | 0.5 | Remaining thick portion |

*In confirmation after 10,000 trials, chipping of slide tool tip observed

As is clear from Table 1, by appropriately selecting the shape of the tip end face of the slide tool, and adjusting the timing of shearing commencement, and the timing for cracking causing rupture, the shearing phenomena is completed simultaneously around the whole rim of the through hole to be formed, so that this can be ruptured around the whole perimeter. Therefore, even for the two side wall portions of the expanded portion where the plate thicknesses are different, complete hydropiercing is possible without any remaining piece. The metal tube finished article formed with the through hole in both side wall portions of the extended portion by the method of the present invention can be used as a steering column outer tube. Moreover, regarding the obtained outer tube, as well as having an integral column bracket without any welding, the processing quality for the hole existing in the opposite side wall portions of the extended portion is high, giving an extremely high quality product. Furthermore, since from the formation of the extended portion until the processing of the hole, is efficiently carried out by a continuous operation within the same die, this results in a product of extremely high economy.

INDUSTRIAL APPLICABILITY

When executing the present invention, the number of holes formed in the metal material does not matter. That is, the number of through holes may of course be one or two, and even with three or more, by providing a slide tool and a die with the necessary number of punch holes it is possible to execute the present invention.

Furthermore, also for the shape of the through hole to be formed, it may be applied of course to a simple circular shape, and also to through holes of various shapes such as an oval shape, an ellipse shape, an approximate square shape, or shapes being a combination of these, or even more complex shapes. This can be executed for example by appropriate combination of the aforementioned structures of the first through seventh examples. In this case, it is considered for example to form a plurality of through holes having shapes different to each other simultaneously by hydropiercing using a die provided with a plurality of punch holes and slide tools.

Furthermore, in the case where the present invention is applied to forming though holes in an extended portion formed by plastically deforming a metal tube in the radial outward direction, the invention is not limited to the case where the metal tube is expanded in one direction, and is also applicable to where this is expanded around the whole perimeter. That is, even in the case where the metal tube is expanded around the whole perimeter, if due to a partial change in the degree of expansion, there is a non-uniform portion where the wall thickness is different, and it is necessary to form a through hole in this part, the present invention can be applied.

In short, the present invention is not limited to the case of forming a through hole in an expanded portion of a hollow member, and can be used for the case of forming a though hole in various types of metal members, in non-uniform portions where there is a difference in plate thickness.

In particular, in the case where the present invention is applied for example to the manufacture of a steering column with an integral column bracket, then compared to the aforementioned basic operation and effect of the present invention, an even better operation and effect is obtained. That is, in the case of making such a steering column, as described before in FIG. 20 to FIG. 23, the hydroforming process for forming the extended portion which becomes the column bracket, and the hole forming process for forming the through hole can be successively executed (substantially at the same time). Therefore, the time and labor consumed in manufacture of the aforementioned steering column is reduced enabling a reduction in price for the manufacturing cost. Furthermore, even in the case of forming a plurality of through holes in one member, since positioning of each of the through holes is effected, it is not necessary to consider how to position the member and the respective through holes. Hence costs can be kept down, and a product in which a plurality of though holes are accurately positioned obtained.

Not only in the case of applying the present invention to forming a though hole in an expanded portion of a column bracket, but also in the case of applying to any portion, there is practically no material deformation such as shear droop at the peripheral portion of the through hole including the rim of the formed through hole, and hence a good surface remains. Therefore, after forming this though hole, later processes for improving the accuracy of the peripheral portion are unnecessary or are simplified. Hence an apparatus or mechanism for after processing becomes unnecessary or is simplified, and costs can be reduced due to a decrease in the cost of equipment and the like.

The respective examples shown in the figures, show the case where the non-uniform portion where the wall thickness is different, is subjected to a hole forming process (hydropiercing). However, also in the case of applying a hole forming process (hydropiercing) to a work hardened non-uniform portion where there is a difference in the degree of work hardening, even though the wall thickness (plate thickness) is the same, problems the same as for a non-uniform portion are likely to arise. Therefore, for such a work hardened non-uniform portion, the timing of shearing commencement at this portion so that the shearing phenomena is completed at the same time, can also be adjusted (designwise setting of conditions) corresponding to the degree of work hardening. In this case, for example the portion where the degree of work hardening is considerable is made to correspond to the portion where the plate thickness is large (thick) in the aforementioned description of the respective examples, and the portion where the degree of work hardening is low (or there is no work hardening) is similarly made to correspond to the portion where the plate thickness is small (thin). The degree of displacement of the timing for the shearing commencement due to the degree of work hardening is obtained experimentally, similarly to the case where the plate thickness is non-uniform. Furthermore, the present invention can of course be executed in relation to a portion where the plate thickness is non-uniform, and also the degree of work hardening is different. In this case also, the degree of displacement in the timing is controlled by experiment corresponding to the plate thickness and the work hardening.

The invention claimed is:

1. A method of manufacturing a metal member with a through hole in one portion of the member that is in sheet form, the through hole passing through a non-uniform wall thickness part of the portion that is in the sheet form, the non-uniform wall thickness part having a difference in thickness at both sides of the through hole in the width direction, the rate of change of plate thickness between both sides being at least 3%, the method comprising the acts of:

when performing hydropiercing in a condition with one face of the non-uniform wall thickness part contacted against a die having a punch hole with a shape and size that matches with the through hole and with a slide tool inserted into the punch hole, the slide tool having a tip face that projects to an inside of the die on a side where the plate thickness is thin and that has a hollowed shape towards an outside of the cue on a side where the plate thickness is thick, corresponding to the plate thickness distribution of the periphery of the through hole to be formed, completing a shearing phenomenon simultaneously around an entire periphery of the through hole to be formed by applying a hydraulic pressure to the other face of the non-uniform wall thickness part, pressing a portion corresponding to the punch hole of the non-uniform wall thickness part into the punch hole by the hydraulic pressure, displacing the slide tool towards the outside, and causing a shearing to be initiated from the side at which the plate thickness is thick.

2. A manufacturing method for a metal member with a through hole according to claim 1, further comprising the acts of positioning a portion of the tip end face of the slide tool which protrudes the most, at a part coinciding with the inside face of the die, to thereby abut the tip end face against the one face of the non-uniform thickness portion, on the side of the non-uniform thickness portion where the plate thickness is thin, and face the side where the plate thickness is thick across a gap before the hydroforming is performed.

3. A manufacturing method for a metal member with a through hole according to claim 1, further comprising the acts of protruding a portion of the tip end face of the slide tool which protrudes the most, from the inside face of the die, and positioning a portion which protrudes the least, at a part coinciding with the inside face of the die, or recessed from the inside face before the hydropiercing is performed, wherein the displacement of the slide tool is implemented in a condition in which the tip end face is abutted against the one face of the non-uniform thickness portion that is bent and follows the tip end portion of the slide tool.

4. A manufacturing method for a metal member with a through hole according to claim 1, wherein a portion where the plate thickness gradually changes at a part of the non-uniform thickness portion is a side wall of an expanded portion made by expanding out one part of a material by hydroforming.

5. A manufacturing method for a metal member with a through hole according to claim 4, wherein the metal member is a steering column, one part of a hollow tube of the steering column being expanded out in the radial direction by hydroforming, and the through hole being formed in a side wall of the expanded out portion, wherein following the operation for processing the expanded out portion, the forming operation for the through hole is carried out.

6. A manufacturing method for a metal member with a through hole according to claim 5, wherein when a virtual plane is considered which includes a central axis of the hollow tube and extends in a perpendicular direction to a direction in which the expanded portion expands, the whole of the through hole is formed at a position away from the virtual plane in the expansion direction.

7. A manufacturing method for a metal member with a through hole according to claim 5, wherein the expanded portion and the non expanded portion are connected through an inclined portion or a stepped portion, and at least a part of the through hole is formed in the inclined portion or the stepped portion.

8. A manufacturing method for a metal member with a through hole according to claim 1, further comprising the act of positioning a portion of the tip end face of the slide tool, which protrudes the most, at a position slightly recessed from the inside face of the die before the hydropiercing is performed, wherein the side where the plate thickness is thin is also pressed in slightly inside the punch hole before the slide tool is displaced such that the time lag in the timing for the start of the shearing at the side where the plate thickness is thick and the side where the plate thickness is thin is reduced.

9. A method of manufacturing a metal member with a through hole in one portion of the member that is in sheet form, the through hole passing through a non-uniform wall thickness part of the portion that is in sheet form, the non-uniform wall thickness part having a difference in thickness at both sides of the through hole in the width direction, and the rate of change of plate thickness between both sides being at least 3%, the method comprising:

when performing hydropiercing in a condition with one face of the non-uniform wall thickness part contacted against a die having a punch hole with a shape and size that matches the through hole and with a slide tool inserted into the punch hole, the die having a cutting edge portion in a peripheral portion of the punch hole of which a radius of curvature of a cross-section shape varies corresponding to the plate thickness distribution of the periphery of the through hole to be formed, such that the radius of curvature is small on the side where the plate thickness is thick and large on the side where the plate thickness is thin, completing a shearing phenomenon simultaneously around an entire periphery of the through hole to be formed by applying a hydraulic pressure to the other face of the non-uniform wall thickness part, pressing a portion corresponding to the punch hole to be formed of the non-uniform wall thickness part into the punch hole by the hydraulic pressure, displacing the slide tool towards the outside, and delaying a shearing on the side where the plate thickness is thin so as to adjust a timing for cracking causing rupture on the periphery of the through hole to be formed on both of the sides.

* * * * *

UNITED STATES PATENT AND TRADEMARK OFFICE
CERTIFICATE OF CORRECTION

PATENT NO. : 8,459,077 B2
APPLICATION NO. : 11/791848
DATED : June 11, 2013
INVENTOR(S) : Shoichi Abe et al.

It is certified that error appears in the above-identified patent and that said Letters Patent is hereby corrected as shown below:

Title Page item (86), should read: PCT No. "PCT/JP2006/302543"

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,459,077 B2  Page 1 of 1
APPLICATION NO. : 11/791848
DATED : June 11, 2013
INVENTOR(S) : Abe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1410 days.

Signed and Sealed this
Eighth Day of September, 2015

Michelle K. Lee
*Director of the United States Patent and Trademark Office*